(12) United States Patent
Rofougaran et al.

(10) Patent No.: US 10,797,407 B2
(45) Date of Patent: Oct. 6, 2020

(54) WIRELESS TRANSCEIVER HAVING RECEIVE ANTENNAS AND TRANSMIT ANTENNAS WITH ORTHOGONAL POLARIZATIONS IN A PHASED ARRAY ANTENNA PANEL

(71) Applicant: Movandi Corporation, Newport Beach, CA (US)

(72) Inventors: Ahmadreza Rofougaran, Newport Coast, CA (US); Farid Shirinfar, Granada Hills, CA (US); Sam Gharavi, Irvine, CA (US); Michael Boers, South Turramurra (AU); Seunghwan Yoon, Irvine, CA (US); Alfred Grau Besoli, Irvine, CA (US); Maryam Rofougaran, Rancho Palos Verdes, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 506 days.

(21) Appl. No.: 15/256,222

(22) Filed: Sep. 2, 2016

(65) Prior Publication Data

US 2018/0069296 A1  Mar. 8, 2018

(51) Int. Cl.
*H01Q 1/24* (2006.01)
*H01Q 21/24* (2006.01)
(Continued)

(52) U.S. Cl.
CPC ............. *H01Q 21/24* (2013.01); *H01Q 1/523* (2013.01); *H01Q 1/525* (2013.01); *H01Q 3/38* (2013.01); *H01Q 3/40* (2013.01); *H01Q 25/001* (2013.01)

(58) Field of Classification Search
CPC ........ H01Q 1/243; H01Q 1/38; H01Q 21/062; H01Q 1/246; H01Q 3/26; H01Q 1/523;
(Continued)

(56) References Cited

U.S. PATENT DOCUMENTS 10,090,887 B1   10/2018   Rofougaran et al.
10,277,370 B2   4/2019    Moshfeghi
(Continued)

OTHER PUBLICATIONS

Corrected Notice of Allowance for U.S. Appl. No. 16/526,544 dated May 13, 2020.
(Continued)

*Primary Examiner* — Robert Karacsony
(74) *Attorney, Agent, or Firm* — Chip Law Group

(57) ABSTRACT

A wireless communications system includes a first transceiver with a first phased array antenna panel having horizontal-polarization receive antennas and vertical-polarization transmit antennas, where the horizontal-polarization receive antennas form a first receive beam based on receive phase and receive amplitude information provided by a first master chip, the vertical-polarization transmit antennas form a first transmit beam based on transmit phase and transmit amplitude information provided by the first master chip. The wireless communications system may include a second transceiver having vertical-polarization receive antennas and horizontal-polarization transmit antennas in a second phased array antenna panel, where the vertical-polarization receive antennas form a second receive beam based on receive phase and receive amplitude information provided by a second master chip, the horizontal-polarization transmit antennas form a second transmit beam based on transmit phase and transmit amplitude information provided by the second master chip.

12 Claims, 10 Drawing Sheets

Figure 1A:
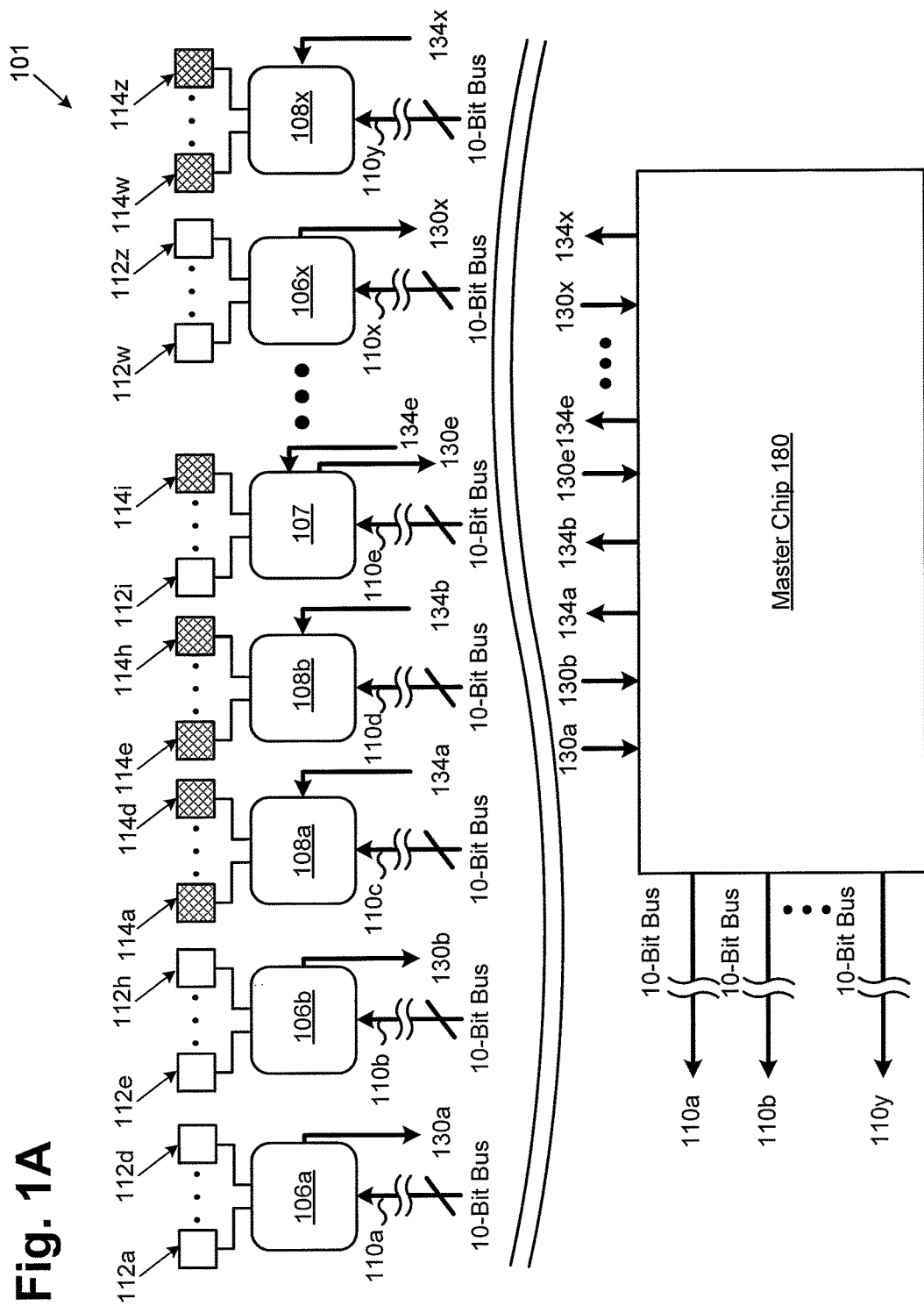

(51) Int. Cl.
*H01Q 3/38* (2006.01)
*H01Q 25/00* (2006.01)
*H01Q 3/40* (2006.01)
*H01Q 1/52* (2006.01)

(58) Field of Classification Search
CPC ............ H01Q 1/525; H01Q 3/28; H01Q 3/30; H01Q 3/34; H01Q 3/36; H01Q 3/38; H01Q 3/40; H01Q 21/22; H01Q 21/24; H01Q 21/28; H01Q 21/293; H01Q 21/296; H01Q 25/001
USPC ................................ 343/702, 824, 844, 853
See application file for complete search history.

(56) References Cited

U.S. PATENT DOCUMENTS

| | | | |
|---|---|---|---|
| 10,320,090 B2* | 6/2019 | Zou | H01Q 21/00 |
| 10,666,326 B2 | 5/2020 | Rofougaran et al. | |
| 2004/0077379 A1* | 4/2004 | Smith | H01Q 1/246 455/562.1 |
| 2004/0082356 A1 | 4/2004 | Walton et al. | |
| 2004/0204114 A1 | 10/2004 | Brennan et al. | |
| 2007/0160014 A1 | 7/2007 | Larsson | |
| 2008/0026763 A1 | 1/2008 | Rensburg et al. | |
| 2008/0303701 A1 | 12/2008 | Zhang et al. | |
| 2009/0010215 A1 | 1/2009 | Kim et al. | |
| 2009/0195455 A1 | 8/2009 | Kim et al. | |
| 2009/0296846 A1 | 12/2009 | Maru | |
| 2010/0046655 A1 | 2/2010 | Lee et al. | |
| 2010/0266061 A1 | 10/2010 | Cheng et al. | |
| 2010/0267415 A1 | 10/2010 | Kakitsu et al. | |
| 2011/0149835 A1 | 6/2011 | Shimada et al. | |
| 2014/0125539 A1* | 5/2014 | Katipally | H01Q 21/062 343/794 |
| 2014/0161018 A1 | 6/2014 | Chang et al. | |
| 2014/0266866 A1* | 9/2014 | Swirhun | G01S 7/026 342/188 |
| 2017/0264014 A1* | 9/2017 | Le-Ngoc | H01Q 21/24 |
| 2017/0332249 A1 | 11/2017 | Guey et al. | |
| 2017/0353338 A1* | 12/2017 | Amadjikpe | H01Q 9/0407 |
| 2019/0319754 A1 | 10/2019 | Moshfeghi | |
| 2019/0319755 A1 | 10/2019 | Moshfeghi | |
| 2019/0319756 A1 | 10/2019 | Moshfeghi | |

OTHER PUBLICATIONS

Corrected Notice of Allowance for U.S. Appl. No. 15/836,198 dated May 22, 2020.
Corrected Notice of Allowance for U.S. Appl. No. 16/294,025 dated May 18, 2020.
Final Office Action for U.S. Appl. No. 16/666,680 dated Jun. 29, 2020.
Non-Final Office Action for U.S. Appl. No. 16/153,735 dated May 13, 2020.
Notice of Allowance for U.S. Appl. No. 15/607,750 dated Jun. 1, 2020.
Corrected Notice of Allowability for U.S. Appl. No. 15/256,222 dated Jul. 10, 2020.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Final Office Action for U.S. Appl. No. 16/125,757 dated Jul. 15, 2020.
Final Office Action for U.S. Appl. No. 16/377,847 dated Jul. 13, 2020.
Non-Final Office Action for U.S. Appl. No. 16/388,043 dated Aug. 3, 2020.
Non-Final Office Action for U.S. Appl. No. 16/819,388 dated Jul. 2, 2020.
Notice of Allowance for U.S. Appl. No. 16/129,413 dated Aug. 12, 2020.
Notice of Allowance for U.S. Appl. No. 16/153,735 dated Jul. 2, 2020.
Notice of Allowance for U.S. Appl. No. 16/684,789 dated Jul. 10, 2020.
Supplemental Notice of Allowability for U.S. Appl. No. 16/153,735 dated Jul. 22, 2020.

* cited by examiner

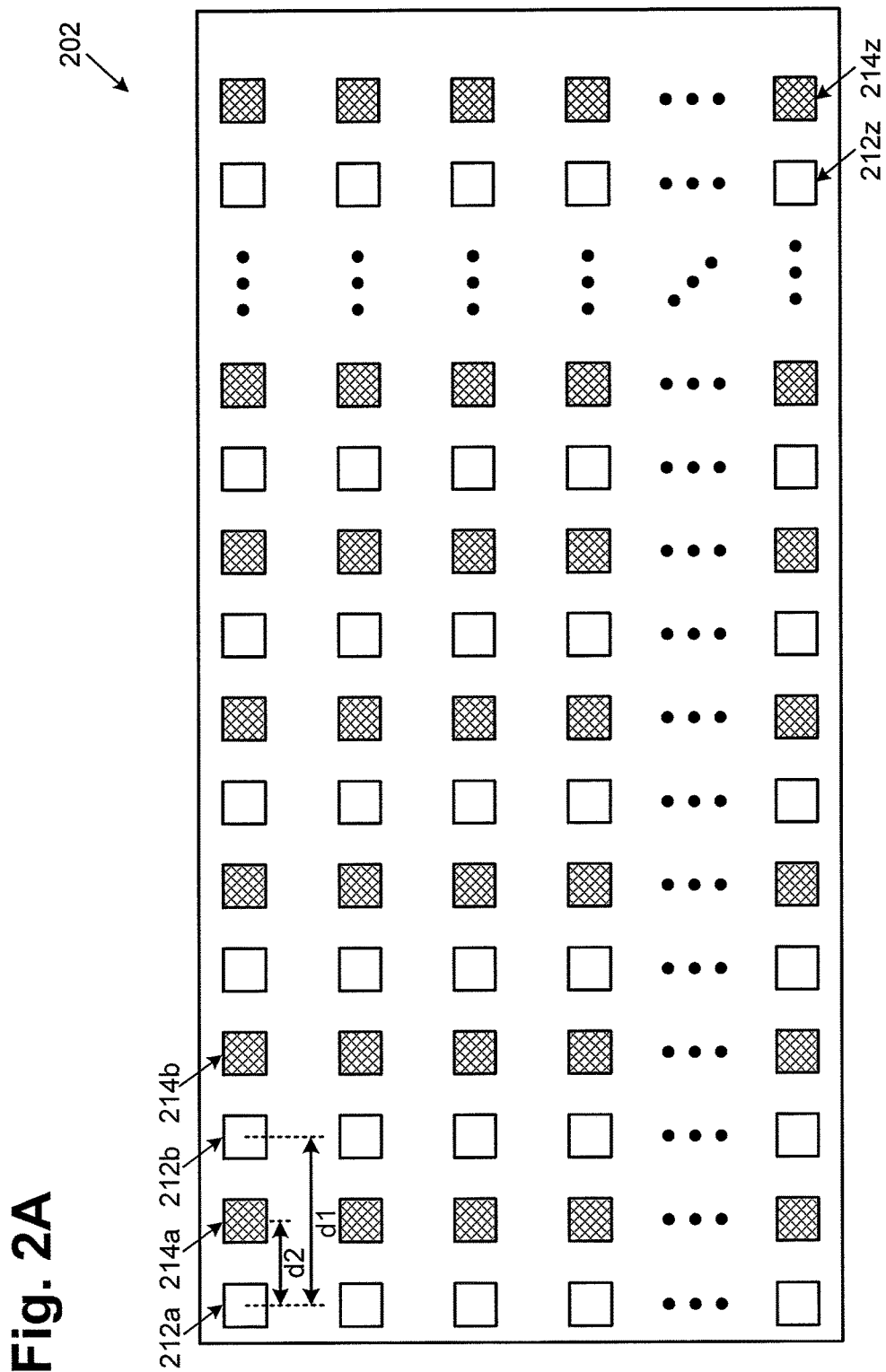

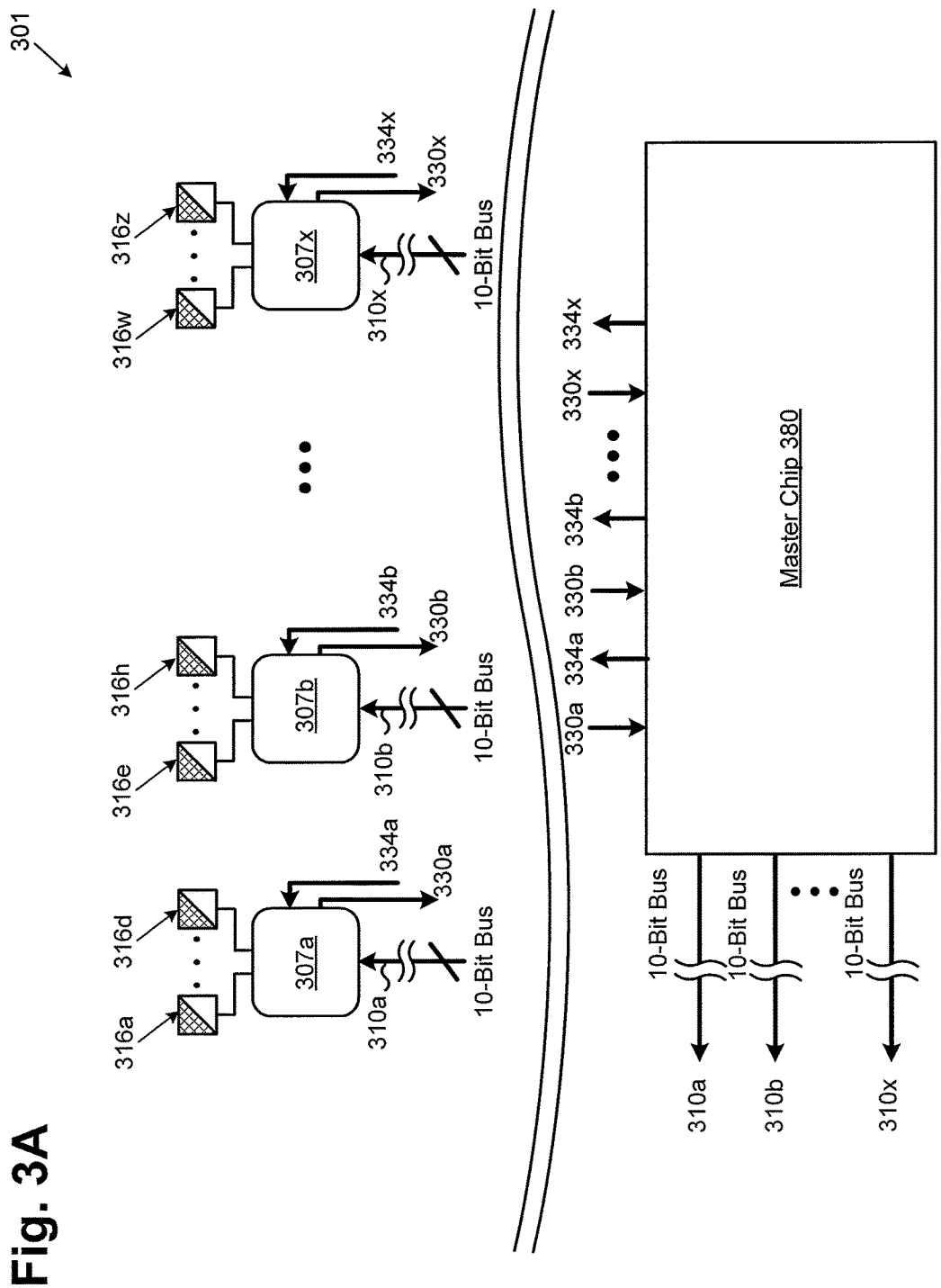

WIRELESS TRANSCEIVER HAVING RECEIVE ANTENNAS AND TRANSMIT ANTENNAS WITH ORTHOGONAL POLARIZATIONS IN A PHASED ARRAY ANTENNA PANEL

RELATED APPLICATION(S)

The present application is related to U.S. Pat. No. 9,923,712, filed on Aug. 1, 2016, and titled "Wireless Receiver with Axial Ratio and Cross-Polarization Calibration," and U.S. Pat. No. 10,323,943, filed on Aug. 1, 2016, and titled "Wireless Receiver with Tracking Using Location, Heading, and Motion Sensors and Adaptive Power Detection," and U.S. Pat. No. 10,290,920, filed on Aug. 2, 2016, and titled "Large Scale Integration and Control of Antennas with Master Chip and Front End Chips on a Single Antenna Panel," and U.S. Pat. No. 10,041,567, filed on Sep. 2, 2016, and titled "Novel Antenna Arrangements and Routing Configurations in Large Scale Integration of Antennas with Front End Chips in a Wireless Receiver," and U.S. Pat. No. 9,692,489, filed on Sep. 2, 2016, and titled "Transceiver Using Novel Phased Array Antenna Panel for Concurrently Transmitting and Receiving Wireless Signals." Each of the above-referenced applications are hereby incorporated herin by reference in its entirety.

BACKGROUND

Wireless communications systems, such as satellite communications systems, can transmit data using orthogonally-polarized-channels occupying the same RF frequency band to increase the available spectrum. However, interference between the orthogonally-polarized-channels is inevitable, and can lead to crosstalk among the channels and symbols comprising data streams, thereby causing an increase in bit error rate (BER) on the receiving end of the wireless communications system. Furthermore, in conventional wireless transceivers that can establish two-way communications to and from satellites, transmit antennas and receive antennas can be arranged on separate antenna panels. In this conventional approach, the transmit panel and the receive panel can be oriented and adjusted separately so that both panels can align precisely with, for example, a target satellite. However, in this conventional approach, wireless transceivers would have a large size due to two separate antenna panels, and would also require a large number of processing elements and complex routing networks to coordinate the transmission and reception operations, which can lead to undesirable signal delays, and high implementation cost and complexity.

Accordingly, there is a need in the art for a compact wireless transceiver that can effectively increase signal isolation and reduce bit error rate.

SUMMARY

The present disclosure is directed to a wireless transceiver having receive antennas and transmit antennas with orthogonal polarizations in a phased array antenna panel, substantially as shown in and/or described in connection with at least one of the figures, and as set forth in the claims.

BRIEF DESCRIPTION OF THE DRAWINGS

FIG. 1A illustrates a functional block diagram of a portion of an exemplary wireless transceiver according to one implementation of the present application.

FIG. 1B illustrates a functional block diagram of a portion of an exemplary wireless transceiver according to one implementation of the present application.

FIG. 2A illustrates a top plan view of a portion of a phased array antenna panel of an exemplary wireless transceiver according to one implementation of the present application.

FIG. 2B illustrates a top plan view of a portion of a phased array antenna panel of an exemplary wireless transceiver according to one implementation of the present application.

FIG. 2C illustrates a top plan view of a portion of a phased array antenna panel of an exemplary wireless transceiver according to one implementation of the present application.

FIG. 2D illustrates a top plan view of a portion of a phased array antenna panel of an exemplary wireless transceiver according to one implementation of the present application.

FIG. 3A illustrates a functional block diagram of a portion of an exemplary wireless transceiver according to one implementation of the present application.

FIG. 3B illustrates a functional block diagram of a portion of an exemplary wireless transceiver according to one implementation of the present application.

FIG. 3C illustrates a top plan view of a portion of a phased array antenna panel of an exemplary wireless transceiver according to one implementation of the present application.

FIG. 4 is an exemplary wireless communications system utilizing exemplary wireless transceivers according to one implementation of the present application.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Referring to FIG. 1A, FIG. 1A illustrates a functional block diagram of a portion of an exemplary wireless transceiver according to one implementation of the present application. As illustrated in FIG. 1A, wireless transceiver 101 includes radio frequency (RF) front end chips 106*a*, 106*b* and 106*x* (collectively referred to as RF front end chips 106*a* through 106*x*), RF front end chip 107, RF front end chips 108*a*, 108*b*, and 108*x* (collectively referred to as RF front end chips 108*a* through 108*x*), receive antennas 112*a*, 112*d*, 112*e*, 112*h*, 112*i*, 112*w* and 112*z* (collectively referred to as receive antennas 112*a* through 112*z*), transmit antennas 114*a*, 114*d*, 114*e*, 114*h*, 114*i*, 114*w* and 114*z* (collectively referred to as transmit antennas 114*a* through 114*z*), and master chip 180. In the present implementation, wireless transceiver 101 includes receive antennas 112*a* through 112*z* and transmit antennas 114*a* through 114*z* in a single phased array antenna panel for transmitting and receiving wireless signals.

As can be seen in FIG. 1A, RF front end chip 106*a* is connected to a group of receive antennas, such as receive antennas 112*a* and 112*d*. RF front end chip 106*b* is connected to a group of receive antennas, such as receive antennas 112*e* and 112*h*. RF front end chip 108*a* is connected to a group of transmit antennas, such as transmit antennas 114*a* and 114*d*. RF front end chip 108*b* is connected to a group of transmit antennas, such as transmit antennas 114*e* and 114*h*. RF front end chip 107 is connected to one or more receive antennas, such as receive antenna 112i, and one or more transmit antennas, such as transmit antenna 114i. RF front end chip 106x is connected to a group of receive antennas, such as receive antennas 112w and 112z. RF front end chip 108x is connected to a group of transmit antennas, such as transmit antennas 114w and 114z. It should be noted that total numbers of receive antennas and transmit antennas may vary to suit the specific needs of a particular application.

Figure 4:
Figure 4:
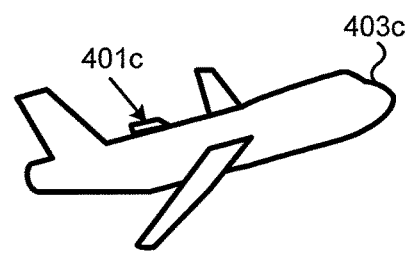
Figure 4:
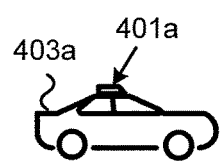
Figure 4:
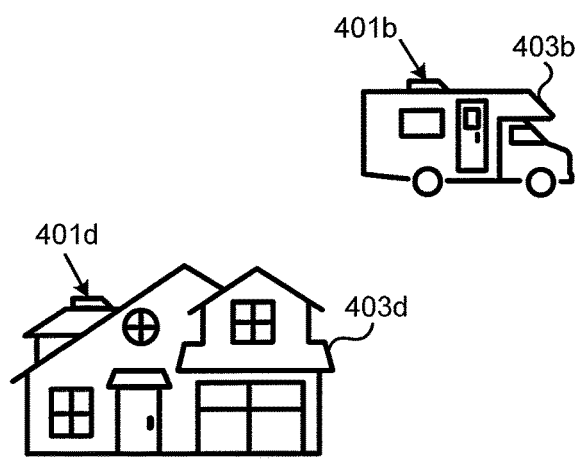

In the present implementation, wireless transceiver 101 may pair with another wireless transceiver, such as satellite 460 or wireless transceiver 401a/401b/401c/401d in FIG. 4, through a handshake procedure to establish conventions for transmission and reception polarizations. Once the pair of wireless transceivers coordinate and establish their transmission and reception polarizations, they can transmit and receive wireless communications signals using the established transmission and reception polarizations.

The present implementation utilizes receive antennas 112a through 112z of a first polarization for reception, and transmit antennas 114a through 114z of a second polarization for transmission. Because the first and second polarizations (e.g., horizontal and vertical polarizations, or right-hand circular-polarization and left-hand circular-polarizations) are orthogonal to each other, the transmit signals transmitted by transmit antennas 114a through 114z and receive signals received by receive antennas 112a through 112z are well isolated from each other, thereby substantially eliminating crosstalk between the transmit and receive signals. In addition, in contrast to conventional communications systems where orthogonally-polarized-channels occupying the same RF frequency band are utilized for transmission/reception, because implementations of the present application utilize only one polarization for transmission and only an orthogonal polarization for reception, interference among transmit and/or receive signals can also be effectively eliminated, thereby substantially reducing the bit error rate of the wireless transceiver.

In the present implementation, each of receive antennas 112a through 112z is a linear-polarization receive antenna of a first polarization, while each of transmit antennas 114a through 114z is a linear-polarization transmit antenna of a second polarization that is orthogonal to the first polarization. For example, in one implementation, receive antennas 112a through 112z are horizontal-polarization receive antennas for receiving horizontally-polarized signals, while transmit antennas 114a through 114z are vertical-polarization transmit antennas for transmitting vertically-polarized signals. In this implementation, receive antennas 112a and 112d may each provide a horizontally-polarized signal to RF front end chip 106a, which combines the horizontally-polarized signals, by adding powers and combining phases of the individual horizontally-polarized signals from receive antennas 112a and 112d, and provides combined signal 130a (i.e., a horizontally-polarized combined signal) to master chip 180. Similarly, receive antennas 112e and 112h may each provide a horizontally-polarized signal to RF front end chip 106b, which combines the horizontally-polarized signals, by adding powers and combining phases of the individual horizontally-polarized signals from receive antennas 112e and 112h, and provides combined signal 130b (i.e., a horizontally-polarized combined signal) to master chip 180. Receive antennas 112i and other receive antennas may each provide a horizontally-polarized signal to RF front end chip 107, which combines the horizontally-polarized signals, by adding powers and combining phases of the individual horizontally-polarized signals from receive antennas 112i a and other receive antennas connected thereto, and provides combined signal 130e (i.e., a horizontally-polarized combined signal) to master chip 180. Also, receive antennas 112w and 112z may each provide a horizontally-polarized signal to RF front end chip 106x, which combines the horizontally-polarized signals, by adding powers and combining phases of the individual horizontally-polarized signals from receive antennas 112w and 112z, and provides combined signal 130x (i.e., a horizontally-polarized combined signal) to master chip 180.

In this implementation, since receive antennas 112a through 112z are horizontal-polarization antennas, transmit antennas 114a through 114z are vertical-polarization antennas. RF front end chip 108a may receive a vertically-polarized combined signal 134a from master chip 180, and provide vertically-polarized signals to transmit antennas 114a and 114d for transmission. RF front end chip 108b may receive a vertically-polarized combined signal 134b from master chip 180, and provide vertically-polarized signals to transmit antennas 114e and 114h for transmission. RF front end chip 107 may receive a vertically-polarized combined signal 134e from master chip 180, and provide vertically-polarized signals to transmit antenna 114i and other transmit antennas connected thereto for transmission. RF front end chip 108x may receive a vertically-polarized combined signal 134x from master chip 180, and provide vertically-polarized signals to transmit antennas 114w and 114z for transmission.

In another implementation, receive antennas 112a through 112z are vertical-polarization receive antennas for receiving vertically-polarized signals, while transmit antennas 114a through 114z are horizontal-polarization transmit antennas for transmitting horizontally-polarized signals. In this implementation, receive antennas 112a and 112d may each provide a vertically-polarized signal to RF front end chip 106a, which combines the vertically-polarized signals, by adding powers and combining phases of the individual vertically-polarized signals from receive antennas 112a and 112d, and provides combined signal 130a (i.e., a vertically-polarized combined signal) to master chip 180. Similarly, receive antennas 112e and 112h may each provide a vertically-polarized signal to RF front end chip 106b, which combines the vertically-polarized signals, by adding powers and combining phases of the individual vertically-polarized signals from receive antennas 112e and 112h, and provides combined signal 130b (i.e., a vertically-polarized combined signal) to master chip 180. Receive antennas 112i and other receive antennas may each provide a vertically-polarized signal to RF front end chip 107, which combines the vertically-polarized signals, by adding powers and combining phases of the individual vertically-polarized signals from receive antennas 112i and other receive antennas connected thereto, and provides combined signal 130e (i.e., a vertically-polarized combined signal) to master chip 180. Also, receive antennas 112w and 112z may each provide a vertically-polarized signal to RF front end chip 106x, which combines the vertically-polarized signals, by adding powers and combining phases of the individual vertically-polarized signals from receive antennas 112w and 112z, and provides combined signal 130x (i.e., a vertically-polarized combined signal) to master chip 180.

In this implementation, since receive antennas 112a through 112z are vertical-polarization antennas, transmit antennas 114a through 114z are horizontal-polarization antennas. RF front end chip 108a may receive a horizontally-polarized combined signal 134a from master chip 180, and provide horizontally-polarized signals to transmit antennas 114a and 114d for transmission. RF front end chip 108b may receive a horizontally-polarized combined signal 134b from master chip 180, and provide horizontally-polarized signals to transmit antennas 114e and 114h for transmission. RF front end chip 107 may receive a horizontally-polarized combined signal 134e from master chip 180, and provide horizontally-polarized signals to transmit antenna 114i and other transmit antennas connected thereto for transmission. RF front end chip 108x may receive a horizontally-polarized combined signal 134x from master chip 180, and provide horizontally-polarized signals to transmit antennas 114w and 114z for transmission.

In another implementation, receive antennas 112a through 112z are right-hand circular-polarization receive antennas for receiving right-hand circularly-polarized signals, while transmit antennas 114a through 114z are left-hand circular-polarization transmit antennas for transmitting left-hand circularly-polarized signals. In yet another implementation, receive antennas 112a through 112z are left-hand circular-polarization receive antennas for receiving left-hand circularly-polarized signals, while transmit antennas 114a through 114z are right-hand circular-polarization transmit antennas for transmitting right-hand circularly-polarized signals.

As illustrated in FIG. 1A, master chip 180 receives combined signals 130a, 130b, 130e and 130x from RF front end chips 106a, 106b, 107 and 106x, respectively. Master chip 180 provides combined signals 134a, 134b, 134e and 134x to RF front end chips 108a, 108b, 107 and 108x, respectively. In addition, master chip 180 also provides control bus 110a, 110b, 110c, 110d, 110e, 110x and 110y to RF front end chips 106a, 106b, 108a, 108b, 107, 106x and 108x, respectively.

In the present implementation, receive antennas 112a through 112z form a receive beam at a receive frequency based on phase and amplitude information provided by master chip 180 to corresponding RF front end chips 106a, 106b, 107 and 106x in a phased array antenna panel, such as phased array antenna panels 202 shown in FIGS. 2A through 2D. Transmit antennas 114a through 114z form a transmit beam at a transmit frequency based on phase and amplitude information provided by master chip 180 to corresponding RF front end chips 108a, 108b, 107 and 108x in the phased array antenna panel.

In one implementation, master chip 180 is configured to drive in parallel control buses 110a through 110y. By way of one example, and without limitation, control buses 110a through 110y are ten-bit control buses in the present implementation. In one implementation, RF front end chips 106a, 106b, 106x, 107, 108a, 108b and 108x, and all the receive and transmit antennas coupled to corresponding RF front end chips 106a, 106b, 106x, 107, 108a, 108b and 108x, and master chip 180 are integrated on a single substrate, such as a printed circuit board.

Figure 1B:
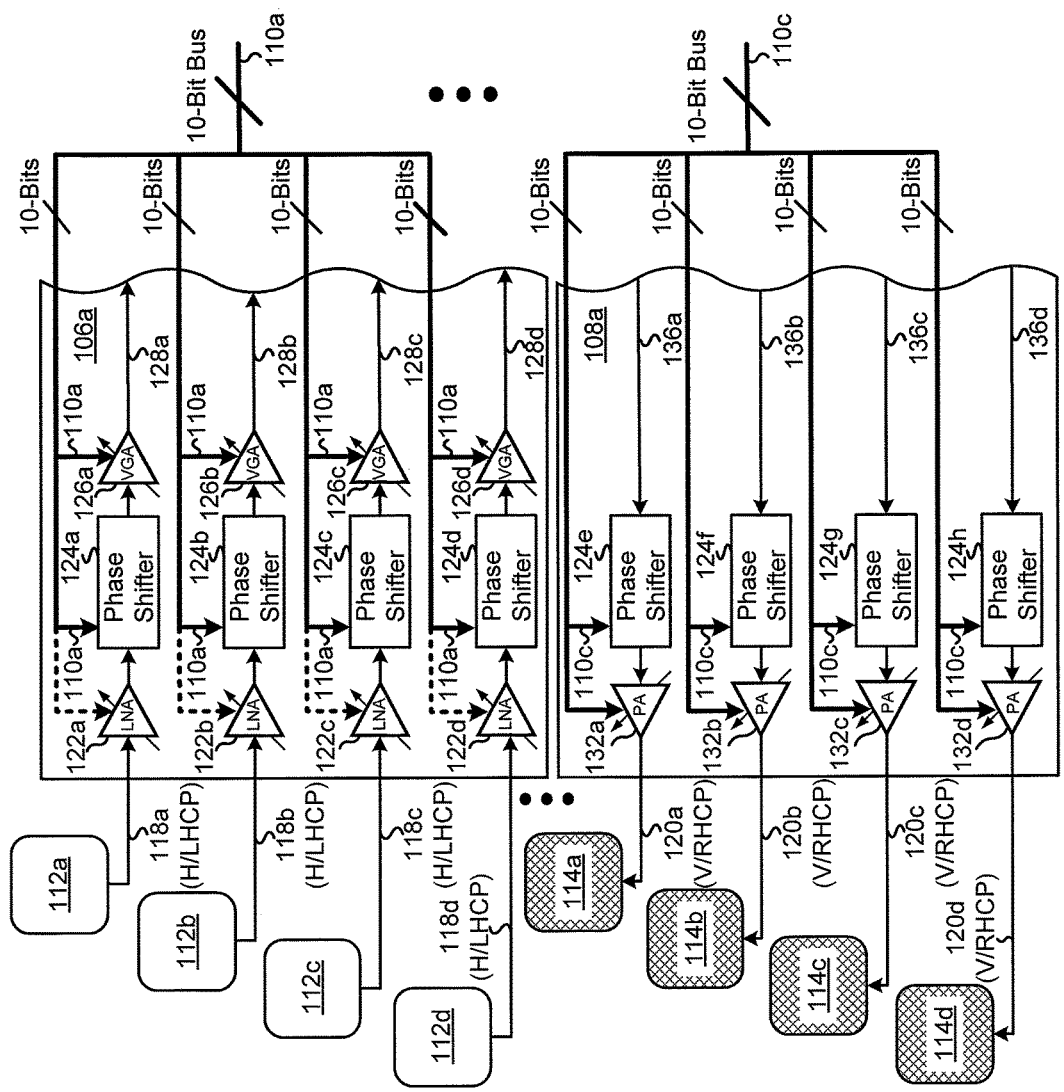

Referring now to FIG. 1B, FIG. 1B illustrates a functional block diagram of a portion of an exemplary wireless transceiver according to one implementation of the present application. With similar numerals representing similar features in FIG. 1A, FIG. 1B includes receive antennas 112a, 112b, 112c and 112d coupled to RF front end chip 106a, and transmit antennas 114a, 114b, 114c and 114d coupled to RF front end chip 108a.

In the present implementation, receive antennas 112a, 112b, 112c and 112d may be configured to receive signals from one or more wireless transceivers, such as commercial geostationary communication satellites or low earth orbit satellites having a very large bandwidth in the 10 GHz to 20 GHz frequency range and a very high data rate. In another implementation, receive antennas 112a, 112b, 112c and 112d may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 1B, in one implementation, receive antennas 112a, 112b, 112c and 112d are horizontal-polarization receive antennas configured to provide horizontally-polarized signals 118a, 118b, 118c and 118d, respectively, to RF front end chip 106a. As shown in FIG. 1B, horizontally-polarized signal 118a from receive antenna 112a is provided to a receive circuit having low noise amplifier (LNA) 122a, phase shifter 124a and variable gain amplifier (VGA) 126a, where LNA 122a is configured to generate an output to phase shifter 124a, and phase shifter 124a is configured to generate an output to VGA 126a. Horizontally-polarized signal 118b from receive antenna 112b is provided to a receive circuit having low noise amplifier (LNA) 122b, phase shifter 124b and variable gain amplifier (VGA) 126b, where LNA 122b is configured to generate an output to phase shifter 124b, and phase shifter 124b is configured to generate an output to VGA 126b. Horizontally-polarized signal 118c from receive antenna 112c is provided to a receive circuit having low noise amplifier (LNA) 122c, phase shifter 124c and variable gain amplifier (VGA) 126c, where LNA 122c is configured to generate an output to phase shifter 124c, and phase shifter 124c is configured to generate an output to VGA 126c. Horizontally-polarized signal 118d from receive antenna 112d is provided to a receive circuit having low noise amplifier (LNA) 122d, phase shifter 124d and variable gain amplifier (VGA) 126d, where LNA 122d is configured to generate an output to phase shifter 124d, and phase shifter 124d is configured to generate an output to VGA 126d.

As further illustrated in FIG. 1B, control bus 110a is provided to RF front end chip 106a, where control bus 110a is configured to provide phase shift information/signals to phase shifters 124a, 124b, 124c and 124d in RF front end chip 106a to cause a phase shift in at least one of horizontally-polarized signals 118a, 118b, 118c and 118d. Control bus 110a is also configured to provide amplitude control information/signals to VGAs 126a, 126b, 126c and 126d, and optionally to LNAs 122a, 122b, 122c and 122d in RF front end chip 106a to cause an amplitude change in at least one of horizontally-polarized signals 118a, 118b, 118c and 118d.

In one implementation, amplified and phase shifted horizontally-polarized signals 128a, 128b, 128c and 128d may be provided to a summation block (not explicitly shown in FIG. 1B), that is configured to sum all of the powers of the amplified and phase shifted horizontally-polarized signals to provide a combined signal to a master chip, such as combined signal 130a (i.e., a horizontally polarized combined signal) provided to master chip 180 in FIG. 1A.

In the present implementation, transmit antennas 114a, 114b, 114c and 114d may be configured to transmit signals to one or more wireless transceivers, such as commercial geostationary communication satellites or low earth orbit satellites having a very large bandwidth in the 10 GHz to 20 GHz frequency range and a very high data rate. In another implementation, transmit antennas 114a, 114b, 114c and 114d may be configured to transmit signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 1B, in one implementation, as receive antennas 112a, 112b, 112c and 112d are horizontal-polarization receive antennas configured to receive horizontally-polarized signals, transmit antennas 114a, 114b, 114c and 114d are vertical-polarization transmit antennas configured to transmit vertically-polarized signals based on vertically-polarized signals 120a, 120b, 120c and 120d, respectively.

As illustrated in FIG. 1B, vertically-polarized input 136a, for example, from master chip 180 in FIG. 1A, is provided to a transmit circuit having phase shifter 124e and power amplifier (PA) 132a, where phase shifter 124e is configured to generate an output to PA 132a, and PA 132a is configured to generate vertically-polarized signal 120a to transmit antenna 114a for transmission. Vertically-polarized input 136b, for example, from master chip 180 in FIG. 1A, is provided to a transmit circuit having phase shifter 124f and power amplifier (PA) 132b, where phase shifter 124f is configured to generate an output to PA 132b, and PA 132b is configured to generate vertically-polarized signal 120b to transmit antenna 114b for transmission. Vertically-polarized input 136c, for example, from master chip 180 in FIG. 1A, is provided to a transmit circuit having phase shifter 124g and power amplifier (PA) 132c, where phase shifter 124g is configured to generate an output to PA 132c, and PA 132c is configured to generate vertically-polarized signal 120c to transmit antenna 114c for transmission. Vertically-polarized input 136d, for example, from master chip 180 in FIG. 1A, is provided to a transmitting circuit having phase shifter 124h and power amplifier (PA) 132d, where phase shifter 124h is configured to generate an output to PA 132d, and PA 132d is configured to generate vertically-polarized signal 120d to transmit antenna 114d for transmission.

As further illustrated in FIG. 1B, control bus 110c is provided to RF front end chip 108a, where control bus 110c is configured to provide phase shift information/signals to phase shifters 124e, 124f, 124g and 124h in RF front end chip 108a to cause a phase shift in at least one of vertically-polarized inputs 136a, 136b, 136c and 136d. Control bus 110c is also configured to provide amplitude control information/signals to PAs 132a, 132b, 132c and 132d in RF front end chip 108a to cause an amplitude change in at least one of vertically-polarized inputs 136a, 136b, 136c and 136d.

In another implementation, receive antennas 112a 112b, 112c and 112d are vertical-polarization antennas, which are configured to provide vertically-polarized signals 118a, 118b, 118c and 118d, respectively, to RF front end chip 106a. In this implementation, transmit antennas 114a 114b, 114c and 114d are horizontal-polarization antennas, where RF front end chip 108a is configured to provide horizontally-polarized signals 120a, 120b, 120c and 120d to transmit antennas 114a 114b, 114c and 114d, respectively, for transmission.

As illustrated in FIG. 1B, in one implementation, receive antennas 112a 112b, 112c and 112d are left-hand circular-polarization receive antennas, which are configured to provide left-hand circularly-polarized signals 118a, 118b, 118c and 118d, respectively, to RF front end chip 106a. In this implementation, transmit antennas 114a 114b, 114c and 114d are right-hand circular-polarization transmit antennas, where RF front end chip 108a is configured to provide right-hand circularly-polarized signals 120a, 120b, 120c and 120d to transmit antennas 114a 114b, 114c and 114d, respectively, for transmission.

In yet another implementation, receive antennas 112a 112b, 112c and 112d are right-hand circular-polarization receive antennas, that are configured to provide right-hand circularly-polarized signals 118a, 118b, 118c and 118d, respectively, to RF front end chip 106a. In this implementation, transmit antennas 114a 114b, 114c and 114d are left-hand circular-polarization transmit antennas, where RF front end chip 108a is configured to provide left-hand circularly-polarized signals 120a, 120b, 120c and 120d to transmit antennas 114a 114b, 114c and 114d, respectively, for transmission.

As can be seen in FIG. 1B, receive antennas 112a through 112d are of a first polarization, while transmit antennas 114a through 114d are of a second polarization, where the first and second polarizations (e.g., horizontal and vertical polarizations, or right-hand circular polarization and left-hand circular polarizations) are orthogonal to each other. As a result, the signals transmitted by transmit antennas 114a through 114d and the signals received by receive antennas 112a through 112d are isolated from each other. In addition, because the present implementation utilizes only one polarization for transmission and only an orthogonal polarization for reception, interference among transmit or receive signals can also be effectively eliminated, thereby substantially reducing the bit error rate of the wireless transceiver.

Referring now to FIG. 2A, FIG. 2A illustrates a top plan view of a portion of a phased array antenna panel of an exemplary wireless transceiver according to one implementation of the present application. As illustrated in FIG. 2A, phased array antenna panel 202 includes receive antennas of a first polarization, such as receive antennas 212a, 212b and 212z (collectively referred to as receive antennas 212a through 212z). Phased array antenna panel 202 also includes transmit antennas of a second polarization that is orthogonal to the first polarization, such as transmit antennas 214a, 214b and 214z (collectively referred to as transmit antennas 214a through 214z). As illustrated in FIG. 2A, receive antennas 212a through 212z and transmit antennas 214a through 214z form an alternating configuration where receive antennas 212a through 212z and transmit antennas 214a through 214z are approximately evenly interspaced in phased array antenna panel 202.

As shown in FIG. 2A, receive antennas 212a and 212b are separated by distance d1, while receive antenna 212a and transmit antenna 214a are separated by distance d2.

In the present implementation, d1=2×d2. In other words, each of the transmit antennas is approximately half-way between two of the receive antennas. In another implementation, there may be multiple transmit antennas between every pair of immediately adjacent receive antennas. In one implementation, the total number of receive antennas 212a through 212z is equal to the total number of transmit antennas 214a through 214z. In another implementation, the total number of receive antennas 212a through 212z and the total number of transmit antennas 214a through 214z may vary to suit the specific needs of a particular application.

As illustrated in FIG. 2A, in the present implementation, receive antennas 212a through 212z and transmit antennas 214a through 214z in phased array antenna panel 202 may each have a substantially square shape of substantially equal size, where the receive frequency and the transmit frequency of the wireless transceiver are set to be the same. In another implementation, transmit antennas 214a through 214z may be slightly smaller than receive antennas 212a through 212z, where the receive frequency and the transmit frequency of the wireless transceiver are set to be different. For example, receive antennas 212a through 212z in phased array antenna panel 202 may receive signals having a receive frequency of approximately 10 GHz, while transmit antennas 214a through 214z in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212a through 212z in phased array antenna panel 202 as shown in FIG. 2A, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2A, receive antennas 212a through 212z in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n*\lambda/4$), such as 7.5 mm, 15 mm, 22.5 mm, and etc.

In one implementation, transmit antennas 214a through 214z in phased array antenna panel 202 as shown in FIG. 2A, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214z may transmit signals at 10 GHz (i.e., $\lambda \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2A, transmit antennas 214a through 214z in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., $n*\lambda/4$), such as 7.5 mm, 15 mm, 22.5 mm, and etc.

In another implementation, transmit antennas 214a through 214z may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., $n*\lambda/4$), such as 6.25 mm, 12.5 mm, 18.75 mm, and etc.

In yet another implementation, using much smaller antenna sizes, transmit antennas 214a through 214z in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214z and receive antennas 212a through 212z in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212z and transmit antennas 214a through 214z, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 107 and 106x in FIG. 1A) associated with receive antennas 212a through 212z. In one implementation, the transmission beam is formed fully electronically by means of phase and amplitude control circuits, for example, in RF front end circuits (such as RF front end chips 108a, 108b, 107 and 108x in FIG. 1A) associated with transmit antennas 214a through 214z. Thus, phased array antenna panel 202 can provide for beamfonning for both reception and transmission without the use of any mechanical parts, thereby reducing signal delay, implementation cost and complexity.

Figure 2B:
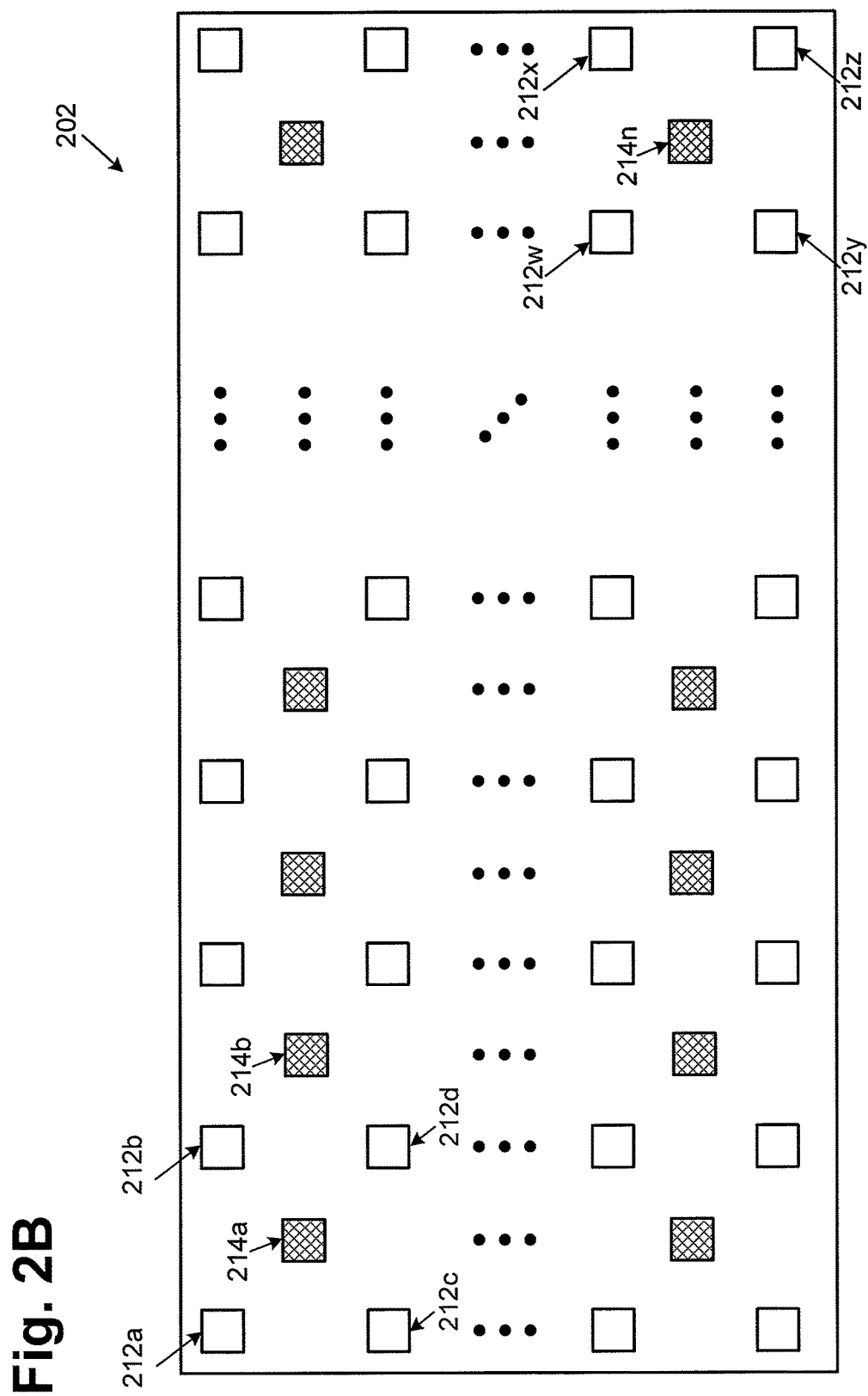

Referring now to FIG. 2B, FIG. 2B illustrates a top plan view of a portion of a phased array antenna panel of an exemplary wireless transceiver according to one implementation of the present application. As illustrated in FIG. 2B, phased array antenna panel 202 includes receive antennas, such as receive antennas 212a, 212b, 212c, 212d, 212w, 212x, 212y and 212z (collectively referred to as receive antennas 212a through 212z). Phased array antenna panel 202 also includes transmit antennas, such as transmit antennas 214a, 214b and 214n (collectively referred to as transmit antennas 214a through 214n).

As illustrated in FIG. 2B, receive antennas 212a through 212z and transmit antennas 214a through 214n form a staggered row configuration where receive antennas 212a through 212z and transmit antennas 214a through 214n are arranged in staggered rows. As illustrated in FIG. 2B, transmit antenna 214a is approximately centered between receive antennas 212a, 212b, 212c and 212d, where transmit antenna 214a is spaced from each of receive antennas 212a, 212b, 212c and 212d at substantially equal distances. Similarly, transmit antenna 214n is approximately centered between receive antennas 212w, 212x, 212y and 212z, where transmit antenna 214n is spaced from each of receive antennas 212w, 212x, 212y and 212z at substantially equal distances. In another implementation, there may be multiple transmit antennas between every group of four receive antennas. In one implementation, the total number of receive antennas 212a through 212z is greater than the total number of transmit antennas 214a through 214n. In another implementation, the total number of receive antennas 212a through 212z and the total number of transmit antennas 214a through 214n may vary to suit the specific needs of a particular application.

As illustrated in FIG. 2B, receive antennas 212a through 212z and transmit antennas 214a through 214n in phased array antenna panel 202 may each have a substantially square shape of substantially equal size, where the receive frequency and the transmit frequency of the wireless transceiver are set to be the same. In another implementation, transmit antennas 214a through 214n may be slightly smaller than receive antennas 212a through 212z, where the receive frequency and the transmit frequency of the wireless transceiver are set to be different. For example, receive antennas 212a through 212z in phased array antenna panel 202 may receive signals having a receive frequency of approximately 10 GHz, while transmit antennas 214a through 214n in phased array antenna panel 202 may transmit signals having a transmit frequency of approximately 12 GHz. As such, the receive frequency and the transmit frequency are separated by approximately 2 GHz to further improve signal isolation between the receive and transmit signals.

In one implementation, receive antennas 212a through 212z in phased array antenna panel 202 as shown in FIG. 2B, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2B, receive antennas 212a through 212z in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., n*$\lambda$/4), such as 7.5 mm, 15 mm, 22.5 mm, and etc.

In one implementation, transmit antennas 214a through 214n in phased array antenna panel 202 as shown in FIG. 2B, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214n may transmit signals at 10 GHz (i.e., $\lambda \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2B, transmit antennas 214a through 214n in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., n*$\lambda$/4), such as 7.5 mm, 15 mm, 22.5 mm, and etc.

In another implementation, transmit antennas 214a through 214n may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., n*$\lambda$/4), such as 6.25 mm, 12.5 mm, 18.75 mm, and etc.

In yet another implementation, using much smaller antenna sizes, transmit antennas 214a through 214n in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214n and receive antennas 212a through 212z in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212z and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 107 and 106x in FIG. 1A) associated with receive antennas 212a through 212z. In one implementation, the transmission beam is formed fully electronically by means of phase and amplitude control circuits, for example, in RF front end circuits (such as RF front end chips 108a, 108b, 107 and 108x in FIG. 1A) associated with transmit antennas 214a through 214n. Thus, phased array antenna panel 202 can provide for beamforming for both reception and transmission without the use of any mechanical parts, thereby reducing signal delay, implementation cost and complexity.

Figure 2C:
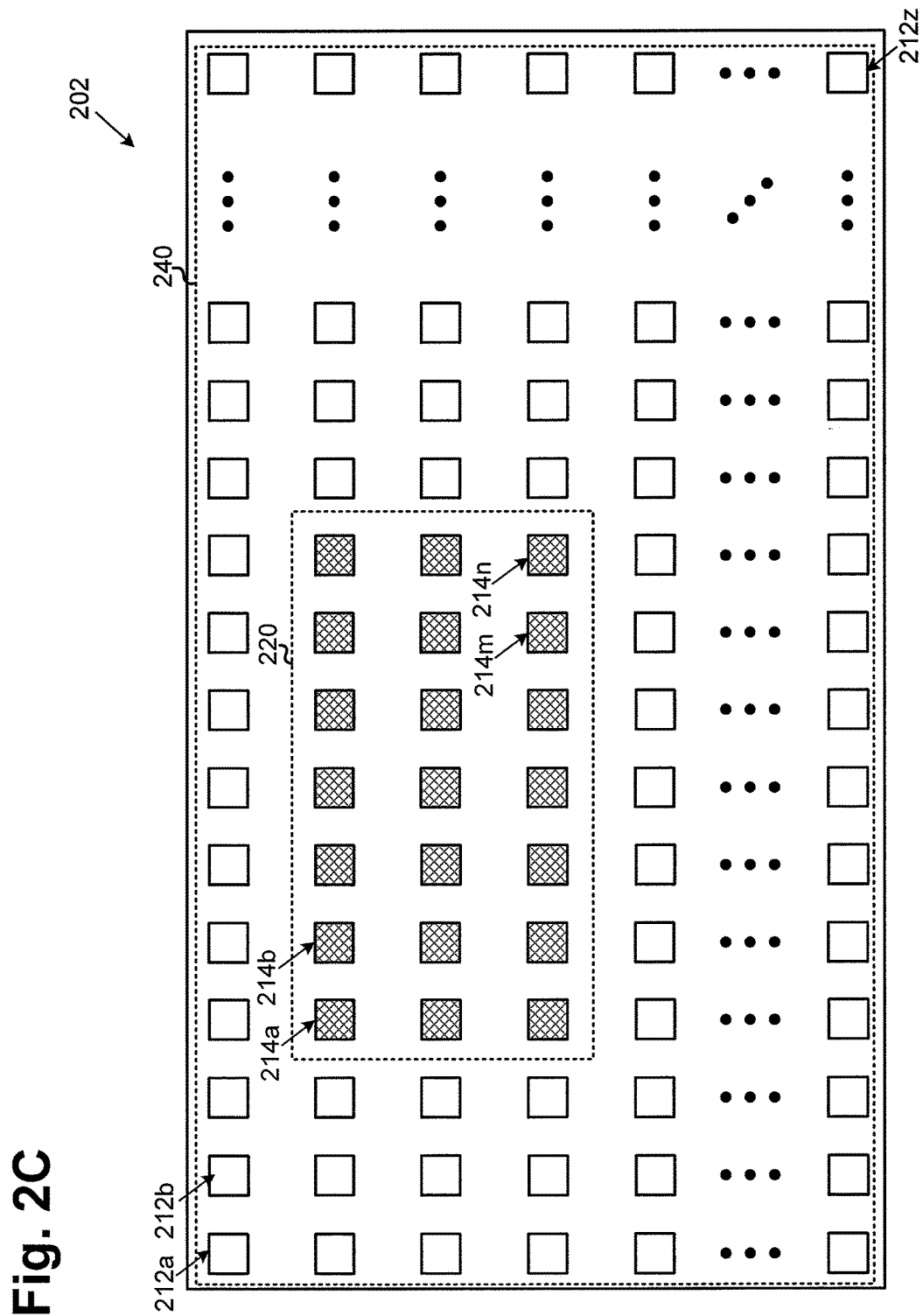

Referring now to FIG. 2C, FIG. 2C illustrates a top plan view of a portion of a phased array antenna panel of an exemplary wireless transceiver according to one implementation of the present application. As illustrated in FIG. 2C, phased array antenna panel 202 includes receive antennas, such as receive antennas 212a, 212b and 212z (collectively referred to as receive antennas 212a through 212z). Phased array antenna panel 202 also includes transmit antennas, such as transmit antennas 214a, 214b, 214m and 214n (collectively referred to as transmit antennas 214a through 214n).

As illustrated in FIG. 2C, receive antennas 212a through 212z are in receive configuration 240. In the present implementation, receive configuration 240 includes a cluster of receive antennas. Transmit antennas 214a through 214n are in transmit configuration 220. In the present implementation, transmit configuration 220 includes a rectangular cluster of transmit antennas. As illustrated in FIG. 2C, the cluster of transmit antennas 214a through 214n is a rectangular cluster of transmit antennas surrounded by the cluster of receive antennas 212a through 212z. In one implementation, the total number of receive antennas 212a through 212z is greater than the total number of transmit antennas 214a through 214n. In another implementation, the number of receive antennas in receive configuration 240 and the number of transmit antennas in transmit configuration 220 may vary to suit the specific needs of a particular application.

As illustrated in FIG. 2C, similar to FIGS. 2A and 2B, receive antennas 212a through 212z and transmit antennas 214a through 214n in phased array antenna panel 202 may each have a substantially square shape of substantially equal size, where the receive frequency and the transmit frequency of the wireless transceiver are set to be the same. In another implementation, transmit antennas 214a through 214n may be slightly smaller than receive antennas 212a through 212z, where the receive frequency and the transmit frequency of the wireless transceiver are set to be different. For example, receive antennas 212a through 212z in phased array antenna panel 202 may receive signals having a receive frequency of approximately 10 GHz, while transmit antennas 214a through 214n in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212a through 212z in phased array antenna panel 202 as shown in FIG. 2C, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., λ≈30 mm), each receive antenna in phased array antenna panel 202 needs an area of at least a quarter wavelength (e.g., λ/4≈7.5 mm) by a quarter wavelength (e.g., λ/4≈7.5 mm) to receive the transmitted signals. As illustrated in FIG. 2C, receive antennas 212a through 212z in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., n*λ/4), such as 7.5 mm, 15 mm, 22.5 mm, and etc.

In one implementation, transmit antennas 214a through 214n in phased array antenna panel 202 as shown in FIG. 2C, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214n may transmit signals at 10 GHz (i.e., λ≈30 mm) to a wireless receiver, such as satellite 460 in FIG. 4, where each transmit antenna in phased array antenna panel 202 needs an area of at least a quarter wavelength (e.g., λ/4≈7.5 mm) by a quarter wavelength (e.g., λ/4≈7.5 mm) to transmit the signals. As illustrated in FIG. 2C, transmit antennas 214a through 214n in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., n*λ/4), such as 7.5 mm, 15 mm, 22.5 mm, and etc.

In another implementation, transmit antennas 214a through 214n may transmit signals at 12 GHz (i.e., λ≈25 mm) to a wireless receiver, such as satellite 460 in FIG. 4. Each transmit antenna in phased array antenna panel 202 needs an area of at least a quarter wavelength (e.g., λ/4≈6.25 mm) by a quarter wavelength (e.g., λ/4≈6.25 mm) to transmit signals at 12 GHz. In one implementation, each adjacent pair of transmit antennas may be separated by a distance of a multiple integer of the quarter wavelength (i.e., n*λ/4), such as 6.25 mm, 12.5 mm, 18.75 mm, and etc.

In yet another implementation, using much smaller antenna sizes, transmit antennas 214a through 214n in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214n and receive antennas 212a through 212z in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212z and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 107 and 106x in FIG. 1A) associated with receive antennas 212a through 212z. In one implementation, the transmission beam is formed fully electronically by means of phase and amplitude control circuits, for example, in RF front end circuits (such as RF front end chips 108a, 108b, 107 and 108x in FIG. 1A) associated with transmit antennas 214a through 214n. Thus, phased array antenna panel 202 can provide for beamforming for both reception and transmission without the use of any mechanical parts, thereby reducing signal delay, implementation cost and complexity.

Figure 2D:
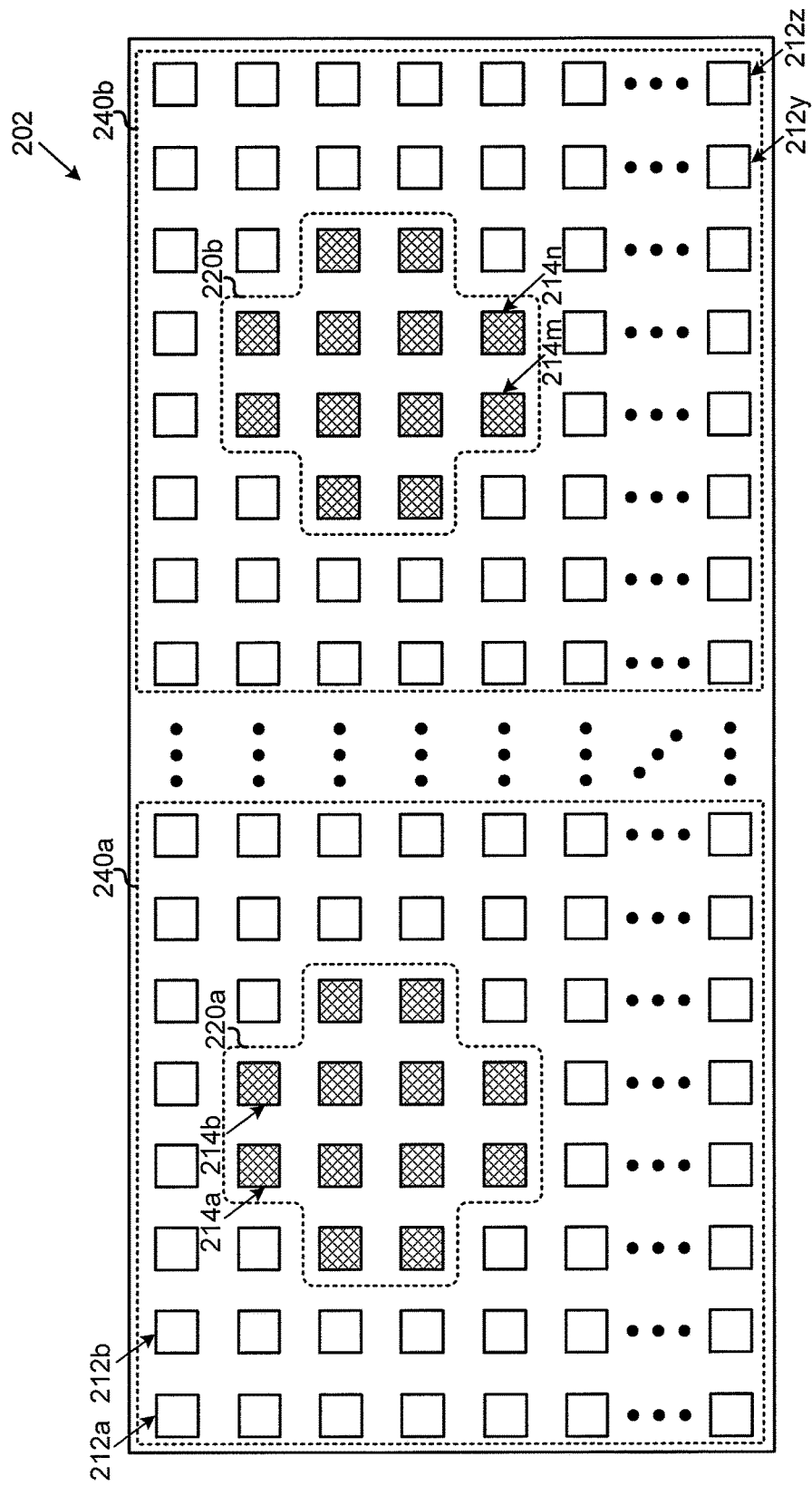

Referring now to FIG. 2D, FIG. 2D illustrates a top plan view of a portion of a phased array antenna panel of an exemplary wireless transceiver according to one implementation of the present application. As illustrated in FIG. 2D, phased array antenna panel 202 includes receive antennas, such as receive antennas 212a, 212b, 212y and 212z (collectively referred to as receive antennas 212a through 212z). Phased array antenna panel 202 also includes transmit antennas, such as transmit antennas 214a, 214b, 214m and 214n (collectively referred to as transmit antennas 214a through 214n).

As illustrated in FIG. 2D, a portion of receive antennas 212a through 212z are in receive configuration 240a, while another portion of receive antennas 212a through 212z are in receive configuration 240b. In the present implementation, each of receive configurations 240a and 240b includes a cluster of receive antennas. As further illustrated in FIG. 2D, a portion of transmit antennas 214a through 214n is in transmit configuration 220a, while another portion of transmit antennas 214a through 214n is in transmit configuration 220b. In the present implementation, each of transmit configurations 220a and 220b is a non-rectangular cluster of transmit antennas. In one implementation, the total number of receive antennas 212a through 212z is greater than the total number of transmit antennas 214a through 214n. In another implementation, the number of receive antennas in receive configuration 240a and the number of transmit antennas in transmit configuration 220a may vary to suit the needs of a particular application. Similarly, the number of receive antennas in receive configuration 240b and the number of transmit antennas in transmit configuration 220b may vary to suit the needs of a particular application.

As illustrated in FIG. 2D, receive antennas 212a through 212z and transmit antennas 214a through 214n in phased array antenna panel 202 may each have a substantially square shape of substantially equal size, where the receive frequency and the transmit frequency of the wireless transceiver are set to be the same. In another implementation, transmit antennas 214a through 214n may be slightly smaller than receive antennas 212a through 212z, where the receive frequency and the transmit frequency of the wireless transceiver are set to be different. For example, receive antennas 212a through 212z in phased array antenna panel 202 may receive signals having a receive frequency of approximately 10 GHz, while transmit antennas 214a through 214n in phased array antenna panel 202 may transmit signals having a transmit frequency of approximately 12 GHz. As such, the receive frequency and the transmit frequency are separated by approximately 2 GHz, for example, to further improve signal isolation between the receive and transmit signals.

In one implementation, receive antennas 212a through 212z in phased array antenna panel 202 as shown in FIG. 2D, may be configured to receive signals from one or more wireless transmitters, such as commercial geostationary communication satellites or low earth orbit satellites having a very large bandwidth in the 10 GHz to 20 GHz frequency range and a very high data rate. In one implementation, for a wireless transmitter, such as satellite 460 in FIG. 4, transmitting signals at 10 GHz (i.e., $\lambda \approx 30$ mm), each receive antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to receive the transmitted signals. As illustrated in FIG. 2D, receive antennas 212a through 212z in phased array antenna panel 202 may each have a substantially square shape having dimensions of 7.5 mm by 7.5 mm, for example. In one implementation, each adjacent pair of receive antennas may be separated by a distance of a multiple integer of the quarter wavelength (i.e., $n*\lambda/4$), such as 7.5 mm, 15 mm, 22.5 mm, and etc.

In one implementation, transmit antennas 214a through 214n in phased array antenna panel 202 as shown in FIG. 2D, may be configured to transmit signals to one or more wireless receivers, such as commercial geostationary communication satellites or low earth orbit satellites having a very large bandwidth in the 10 GHz to 20 GHz frequency range and a very high data rate. In one implementation, transmit antennas 214a through 214n may transmit signals at 10 GHz (i.e., $\lambda \approx 30$ mm) to a wireless receiver, such as satellite 460 in FIG. 4, where each transmit antenna in phased array antenna panel 202 needs an area of at least a quarter wavelength (e.g., $\lambda/4 \approx 7.5$ mm) by a quarter wavelength (e.g., $\lambda/4 \approx 7.5$ mm) to transmit the signals. As illustrated in FIG. 2D, transmit antennas 214a through 214n in phased array antenna panel 202 may each have a substantially square shape having dimensions of 7.5 mm by 7.5 mm, for example. In one implementation, each adjacent pair of transmit antennas may be separated by a distance of a multiple integer of the quarter wavelength (i.e., $n*\lambda/4$), such as 7.5 mm, 15 mm, 22.5 mm, and etc.

In another implementation, transmit antennas 214a through 214n may transmit signals at 12 GHz (i.e., $\lambda \approx 25$ mm) to a wireless receiver, such as satellite 460 in FIG. 4. Each transmit antenna in phased array antenna panel 202 needs an area of at least a quarter wavelength (e.g., $\lambda/4 \approx 6.25$ mm) by a quarter wavelength (e.g., $\lambda/4 \approx 6.25$ mm) to transmit signals at 12 GHz. In one implementation, each adjacent pair of transmit antennas may be separated by a distance of a multiple integer of the quarter wavelength (i.e., $n*\lambda/4$), such as 6.25 mm, 12.5 mm, 18.75 mm, and etc.

In yet another implementation, using much smaller antenna sizes, transmit antennas 214a through 214n in phased array antenna panel 202 may be configured to transmit signals in the 60 GHz frequency range, while receive antennas 212a through 212z in phased array antenna panel 202 may also be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. In that implementation, transmit antennas 214a through 214n and receive antennas 212a through 212z in phased array antenna panel 202 may have substantially equal sizes (that are both generally much smaller than antenna sizes used in 10 GHz or 12 GHz communications).

In the present implementation, phased array antenna panel 202 is a flat panel array employing receive antennas 212a through 212z and transmit antennas 214a through 214n, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 106a, 106b, 107 and 106x in FIG. 1A) associated with receive antennas 212a through 212z. In one implementation, the transmission beam is formed fully electronically by means of phase and amplitude control circuits, for example, in RF front end circuits (such as RF front end chips 108a, 108b, 107 and 108x in FIG. 1A) associated with transmit antennas 214a through 214n. Thus, phased array antenna panel 202 can provide for beamforming for both reception and transmission without the use of any mechanical parts, thereby reducing signal delay, implementation cost and complexity.

Referring now to FIG. 3A, FIG. 3A illustrates a functional block diagram of a portion of an exemplary wireless transceiver according to one implementation of the present application. As illustrated in FIG. 3A, wireless transceiver 301 includes radio frequency (RF) front end chips 307a, 307b and 307x (collectively referred to as RF front end chips 307a through 307x), reconfigurable receive/transmit antennas 316a, 316d, 316e, 316h, 316w and 316z (collectively referred to as reconfigurable receive/transmit antennas 316a through 316z), and master chip 380. In the present implementation, wireless transceiver 301 includes reconfigurable receive/transmit antennas 316a through 316z in a single phased array antenna panel for transmitting and receiving wireless signals.

As can be seen in FIG. 3A, RF front end chip 307a is connected to a group of reconfigurable receive/transmit antennas, such as reconfigurable receive/transmit antennas 316a and 316d. RF front end chip 307b is connected to a group of reconfigurable receive/transmit antennas, such as reconfigurable receive/transmit antennas 316e and 316h. Also, RF front end chip 307x is connected to a group of reconfigurable receive/transmit antennas, such as reconfigurable receive/transmit antennas 316w and 316z. It should be noted that total numbers of reconfigurable receive/transmit antennas may vary to suit the specific needs of a particular application.

In the present implementation, wireless transceiver 301 may pair with another wireless transceiver, such as satellite 460 or wireless transceiver 401a/401b/401c/401d in FIG. 4, through a handshake procedure to establish conventions for transmission and reception polarizations. Once the pair of wireless transceivers coordinate and establish their respective polarizations, they can transmit and receive wireless communications signals using the established transmission and reception polarizations.

In the present implementation, master chip 380 and/or RF front end chips 307a through 307x can set some or all reconfigurable receive/transmit antennas 316a through 316z to be receive antennas of a first polarization during a reception mode, and set some or all reconfigurable receive/ transmit antennas 316a through 316z to be transmit antennas of a second polarization during a transmission mode. In this manner, reconfigurable receive/transmit antennas 316a through 316z can support a reception mode that is compatible for a pairing transceiver by reconfiguring antennas 316a through 316z to, for example, receive only horizontally-polarized signals for a period of time (or indefinitely if so desired), or receive only vertically-polarized signals for another period of time (or indefinitely if so desired). Similarly, reconfigurable receive/transmit antennas 316a through 316z can support a transmission mode that is compatible for a pairing transceiver by reconfiguring antennas 316a through 316z to, for example, transmit only horizontally-polarized signals for a period of time (or indefinitely if so desired), or transmit only vertically-polarized signals for another period of time (or indefinitely, if so desired).

Moreover, master chip 380 and/or RF front end chips 307a through 307x can set a first group of reconfigurable receive/transmit antennas 316a through 316z to be receive antennas of a first polarization, and set a second group of reconfigurable receive/transmit antennas 316a through 316z to be transmit antennas of a second polarization. In this manner, the first group of reconfigurable receive/transmit antennas 316a through 316z can support a reception mode that is compatible with a pairing transceiver and receive only horizontally-polarized signals or receive only vertically-polarized signals, while the second group of reconfigurable receive/transmit antennas 316a through 316z can support a transmission mode that is compatible with a pairing transceiver and transmit only vertically-polarized signals or transmit only horizontally-polarized signals.

Because the first polarization and the second polarization are orthogonal to each other, the signals transmitted by reconfigurable receive/transmit antennas 316a through 316z and the signals received by reconfigurable receive/transmit antennas 316a through 316z are isolated from each other. In addition, because the present implementation utilizes only one polarization for transmission and only an orthogonal polarization for reception, interference among transmit and/or receive signals can also be effectively eliminated, thereby substantially reducing the bit error rate of the wireless transceiver.

As stated above, in the present implementation, each of reconfigurable receive/transmit antennas 316a through 316z may be a linear-polarization receive antenna. In the present implementation, one or more reconfigurable receive/transmit antennas 316a through 316z may be configured to be horizontal-polarization receive antennas for receiving horizontally-polarized signals during the reception mode in one period of time, while in the transmission mode in another period of time, reconfigurable receive/transmit antennas 316a through 316z may be configured to be vertical-polarization transmit antennas for transmitting vertically-polarized signals. For example, reconfigurable receive/transmit antennas 316a and 316d may each provide a horizontally-polarized signal to RF front end chip 307a, which combines the horizontally-polarized signals, by adding powers and combining phases of the individual horizontally-polarized signals from reconfigurable receive/transmit antennas 316a and 316d, and provides combined signal 330a (i.e., a horizontally polarized combined signal) to master chip 380. Similarly, reconfigurable receive/transmit antennas 316e and 316h may each provide a horizontally-polarized signal to RF front end chip 307b, which combines the horizontally-polarized signals, by adding powers and combining phases of the individual horizontally-polarized signals from reconfigurable receive/transmit antennas 316e and 316h, and provides combined signal 330b (i.e., a horizontally polarized combined signal) to master chip 380. Reconfigurable receive/transmit antennas 316w and 316z may each provide a horizontally-polarized signal to RF front end chip 307x, which combines the horizontally-polarized signals, by adding powers and combining phases of the individual horizontally-polarized signals from reconfigurable receive/transmit antennas 316w and 316z, and provides combined signal 330x (i.e., a horizontally polarized combined signal) to master chip 380.

While reconfigurable receive/transmit antennas 316a through 316z are in the transmission mode in another period of time, RF front end chip 307a may receive vertically polarized combined signal 334a from master chip 380, and provide vertically-polarized signals to reconfigurable receive/transmit antennas 316a and 316d for transmission. RF front end chip 307b may receive vertically polarized combined signal 334b from master chip 380, and provide vertically-polarized signals to reconfigurable receive/transmit antennas 316e and 316h for transmission. RF front end chip 307x may receive vertically polarized combined signal 334x from master chip 380, and provide vertically-polarized signals to reconfigurable receive/transmit antennas 316w and 316z for transmission.

In another implementation, one or more reconfigurable receive/transmit antennas 316a through 316z may be configured to be vertical-polarization receive antennas for receiving vertically-polarized signals during the reception mode in a period of time, while in the transmission mode in another period of time, reconfigurable receive/transmit antennas 316a through 316z may be configured to be horizontal-polarization transmit antennas for transmitting horizontally-polarized signals. For example, reconfigurable receive/transmit antennas 316a and 316d may each provide a vertically-polarized signal to RF front end chip 307a, which combines the vertically-polarized signals, by adding powers and combining phases of the individual vertically-polarized signals from reconfigurable receive/transmit antennas 316a and 316d, and provides combined signal 330a (i.e., a vertically-polarized combined signal) to master chip 380. Similarly, reconfigurable receive/transmit antennas 316e and 316h may each provide a vertically-polarized signal to RF front end chip 307b, which combines the vertically-polarized signals, by adding powers and combining phases of the individual vertically-polarized signals from reconfigurable receive/transmit antennas 316e and 316h, and provides combined signal 330b (i.e., a vertically-polarized combined signal) to master chip 380. Reconfigurable receive/transmit antennas 316w and 316z may each provide a vertically-polarized signal to RF front end chip 307x, which combines the vertically-polarized signals, by adding powers and combining phases of the individual vertically-polarized signals from reconfigurable receive/transmit antennas 316w and 316z, and provides combined signal 330x (i.e., a vertically-polarized combined signal) to master chip 380.

While reconfigurable receive/transmit antennas 316a through 316z are in the transmission mode in another period of time, RF front end chip 307a may receive horizontally polarized combined signal 334a from master chip 380, and provide horizontally-polarized signals to reconfigurable receive/transmit antennas 316a and 316d for transmission. RF front end chip 307b may receive horizontally polarized combined signal 334b from master chip 380, and provide horizontally-polarized signals to reconfigurable receive/transmit antennas 316e and 316h for transmission. RF front end chip 307x may receive horizontally polarized combined signal 334x from master chip 380, and provides horizontally-polarized signals to reconfigurable receive/transmit antennas 316w and 316z for transmission.

In another implementation, each reconfigurable receive/transmit antennas, such as reconfigurable receive/transmit antennas 316a through 316z, may be a circular-polarization receive antenna. For example, one or more reconfigurable receive/transmit antennas 316a through 316z may be configured to be left-hand circular-polarization receive antennas for receiving left-hand circularly-polarized signals in one period of time, while in another period of time, reconfigurable receive/transmit antennas 316a through 316z may be configured to be right-hand circular-polarization transmit antennas for transmitting right-hand circularly-polarized signals. In yet another implementation, one or more reconfigurable receive/transmit antennas 316a through 316z may be configured to be right-hand circular-polarization receive antennas for receiving right-hand circularly-polarized signals in one period of time, while in another period of time, reconfigurable receive/transmit antennas 316a through 316z may be configured to be left-hand circular-polarization transmit antennas for transmitting left-hand circularly-polarized signals.

As illustrated in FIG. 3A, master chip 380 receives combined signals 330a, 330b and 330x from RF front end chips 307a, 307b and 307x, respectively. Master chip 380 provides combined signals 334a, 334b and 334x to RF front end chips 307a, 307b and 307x, respectively. In addition, master chip 380 also provides control bus 310a, 310b and 310x to RF front end chips 307a, 307b and 307x, respectively.

Figure 3B:
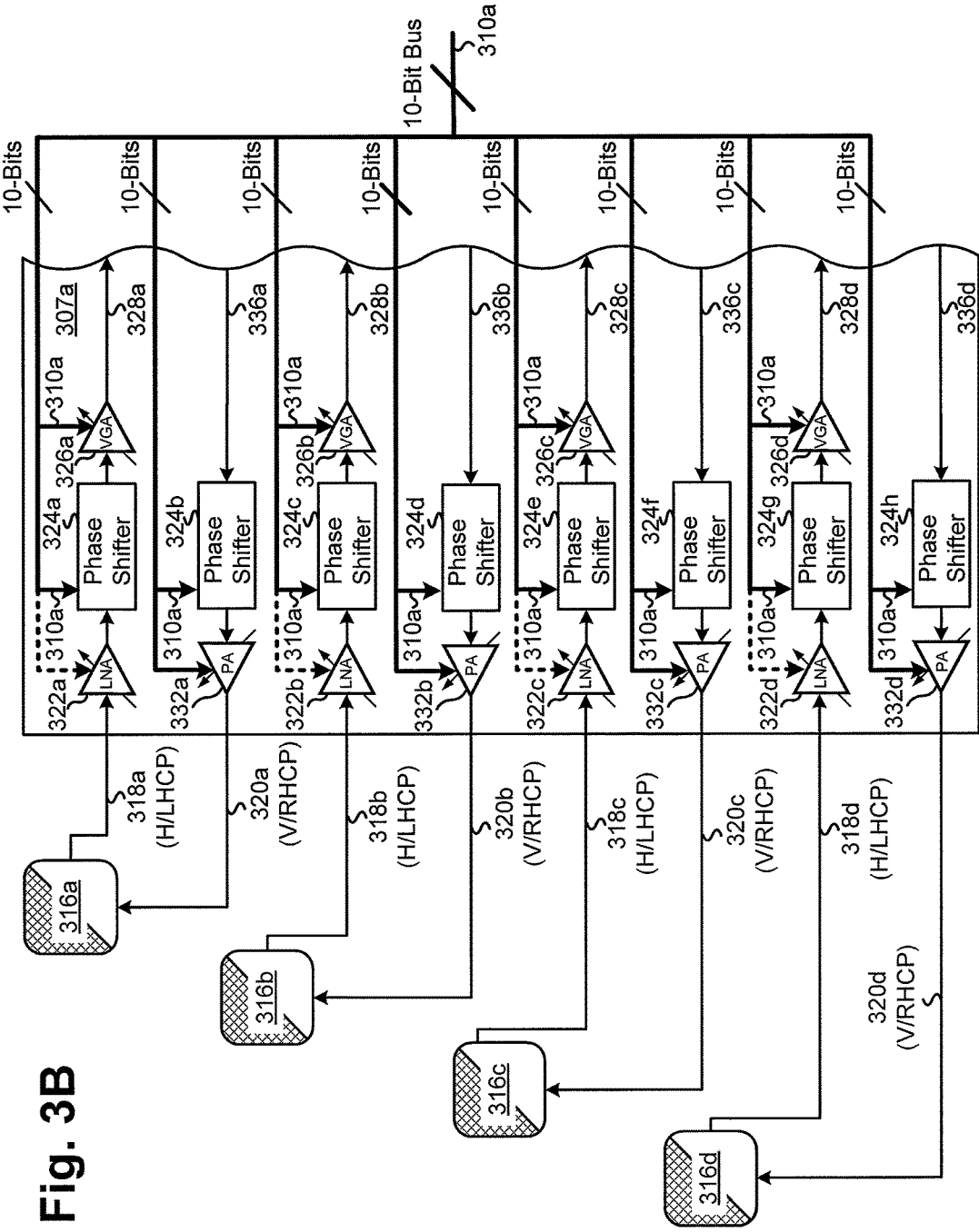
Figure 3C:
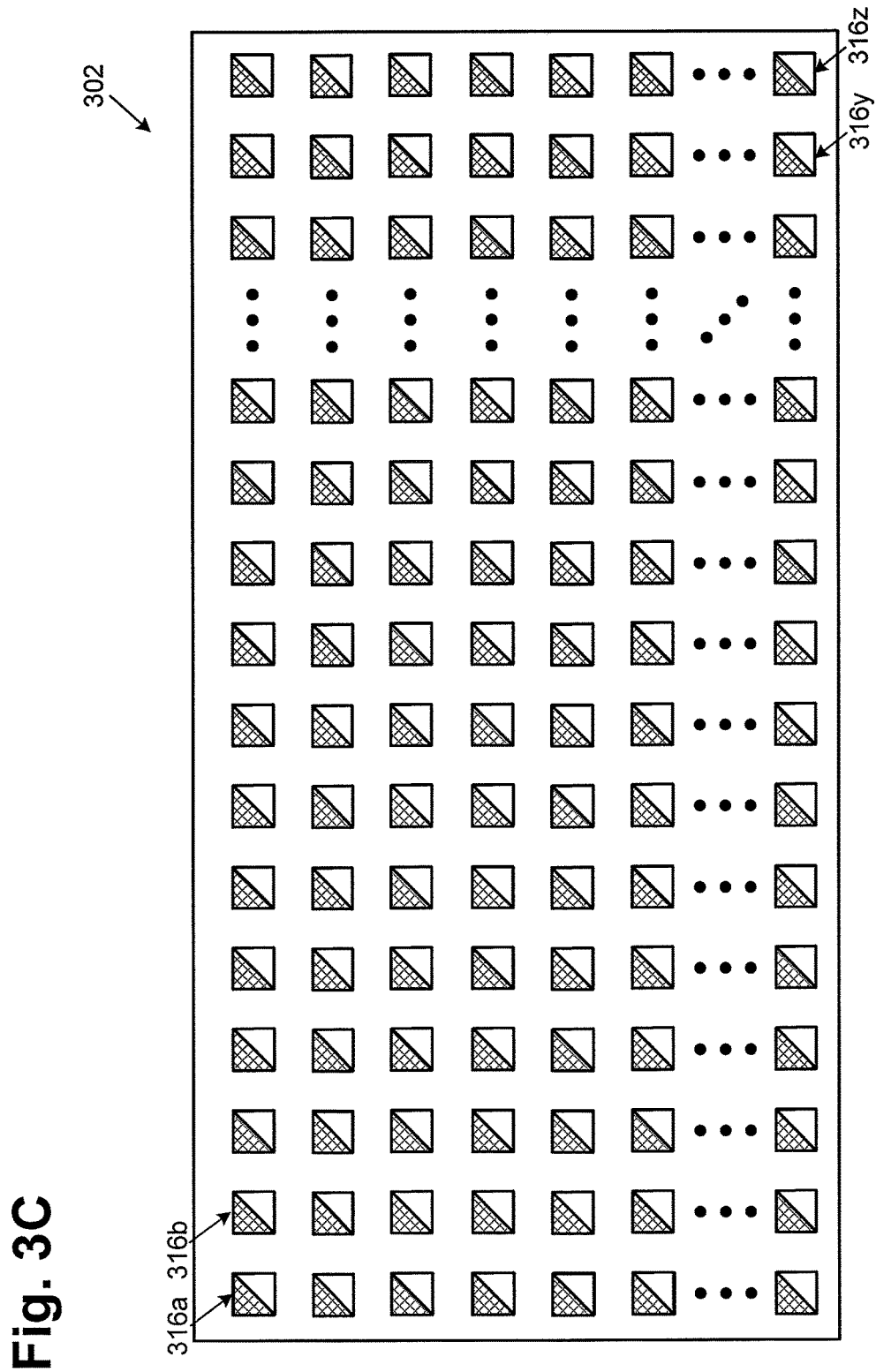

In the present implementation, reconfigurable receive/transmit antennas 316a and 316z, while in the reception mode, form a receive beam at a receive frequency based on phase and amplitude information/signals provided by master chip 380 to corresponding RF front end chips 307a, 307b and 307x in a phased array antenna panel, such as phased array antenna panel 302 shown in FIG. 3C. Reconfigurable receive/transmit antennas 316a and 316z, while in the transmission mode, form a transmit beam at a transmit frequency based on phase and amplitude information provided by master chip 380 to corresponding RF front end chips 307a, 307b and 307x in the phased array antenna panel.

In one implementation, master chip 380 is configured to drive in parallel control buses 310a through 310x. By way of one example, and without limitation, control buses 310a through 310x are ten-bit control buses in the present implementation. In one implementation, RF front end chips 307a, 307b and 307x, and reconfigurable receive/transmit antennas 316a and 316z corresponding RF front end chips 307a, 307b and 307x, and master chip 380 are integrated on a single substrate, such as a printed circuit board.

FIG. 3B illustrates a functional block diagram of a portion of an exemplary wireless transceiver according to one implementation of the present application. With similar numerals representing similar features in FIG. 3A, FIG. 3B includes reconfigurable receive/transmit antennas 316a, 316d, 316c and 316d coupled to RF front end chip 307a.

In the present implementation, reconfigurable receive/transmit antennas 316a, 316d, 316c and 316d may be configured to receive signals from one or more wireless transceivers, such as commercial geostationary communication satellites or low earth orbit satellites having a very large bandwidth in the 10 GHz to 20 GHz frequency range and a very high data rate. In another implementation, reconfigurable receive/transmit antennas 316a, 316d, 316c and 316d may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 3B, in one implementation, reconfigurable receive/transmit antennas 316a, 316d, 316c and 316d may be configured to be horizontal-polarization receive antennas to provide horizontally-polarized signals 318a, 318b, 318c and 318d, respectively, to RF front end chip 307a. As shown in FIG. 3B, when the wireless transceiver is in the reception mode, horizontally-polarized signal 318a from reconfigurable receive/transmit antenna 316a is provided to a receive circuit having low noise amplifier (LNA) 322a, phase shifter 324a and variable gain amplifier (VGA) 326a, where LNA 322a is configured to generate an output to phase shifter 324a, and phase shifter 324a is configured to generate an output to VGA 326a. Horizontally-polarized signal 318b from reconfigurable receive/transmit antenna 316b is provided to a receive circuit having low noise amplifier (LNA) 322b, phase shifter 324c and variable gain amplifier (VGA) 326b, where LNA 322b is configured to generate an output to phase shifter 324c, and phase shifter 324c is configured to generate an output to VGA 326b. Horizontally-polarized signal 318c from reconfigurable receive/transmit antenna 316c is provided to a receive circuit having low noise amplifier (LNA) 322c, phase shifter 324e and variable gain amplifier (VGA) 326c, where LNA 322c is configured to generate an output to phase shifter 324e, and phase shifter 324e is configured to generate an output to VGA 326c. Horizontally-polarized signal 318d from reconfigurable receive/transmit antenna 316d is provided to a receive circuit having low noise amplifier (LNA) 322d, phase shifter 324g and variable gain amplifier (VGA) 326d, where LNA 322d is configured to generate an output to phase shifter 324g, and phase shifter 324g is configured to generate an output to VGA 326d.

As further illustrated in FIG. 3B, control bus 310a is provided to RF front end chip 307a, where control bus 310a is configured to provide phase shift information/signals to phase shifters 324a, 324c, 324e and 324g in RF front end chip 307a to cause a phase shift in at least one of horizontally-polarized signals 318a, 318b, 318c and 318d. Control bus 310a is also configured to provide amplitude control information/signals to VGAs 326a, 326b, 326c and 326d, and optionally to LNAs 322a, 322b, 322c and 322d in RF front end chip 307a to cause an amplitude change in at least one of horizontally-polarized signals 318a, 318b, 318c and 318d.

In one implementation, amplified and phase shifted horizontally-polarized signals 328a, 328b, 328c and 328d may be provided to a summation block (not explicitly shown in FIG. 3B), that is configured to sum all of the powers of the amplified and phase shifted horizontally-polarized signals to provide a combined signal to a master chip, such as combined signal 330a (i.e., a horizontally polarized combined signal) provided to master chip 380 in FIG. 3A.

As illustrated in FIG. 3B, when the wireless transceiver is in the transmission mode, reconfigurable receive/transmit antennas 316a, 316d, 316c and 316d may be configured to transmit signals to one or more wireless transceivers, such as commercial geostationary communication satellites or low earth orbit satellites having a very large bandwidth in the 10 GHz to 20 GHz frequency range and a very high data rate. In another implementation, reconfigurable receive/transmit antennas 316a, 316d, 316c and 316d may be may be configured to transmit signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

As illustrated in FIG. 3B, while the wireless transceiver is in the transmission mode, reconfigurable receive/transmit antennas 316a, 316d, 316c and 316d may be vertical-polarization transmit antennas configured to transmit vertically-polarized signals based on vertically-polarized signals 320a, 320b, 320c and 320d, respectively. In the transmission mode, vertically-polarized input 336a, for example, from master chip 380 in FIG. 3A, is provided to a transmit circuit having phase shifter 324b and power amplifier (PA) 332a, where phase shifter 324b is configured to generate an output to PA 332a, and PA 332a is configured to generate vertically-polarized signal 320a to reconfigurable receive/transmit antenna 316a for transmission. Vertically-polarized input 336b, for example, from master chip 380 in FIG. 3A, is provided to a transmit circuit having phase shifter 324d and power amplifier (PA) 332b, where phase shifter 324d is configured to generate an output to PA 332b, and PA 332b is configured to generate vertically-polarized signal 320b to reconfigurable receive/transmit antenna 316b for transmission. Vertically-polarized input 336c, for example, from master chip 380 in FIG. 3A, is provided to a transmit circuit having phase shifter 324f and power amplifier (PA) 332c, where phase shifter 324f is configured to generate an output to PA 332c, and PA 332c is configured to generate vertically-polarized signal 320c to reconfigurable receive/transmit antenna 316c for transmission. Vertically-polarized input 336d, for example, from master chip 380 in FIG. 3A, is provided to a transmitting circuit having phase shifter 324h and power amplifier (PA) 332d, where phase shifter 324h is configured to generate an output to PA 332d, and PA 332d is configured to generate vertically-polarized signal 320d to reconfigurable receive/transmit antenna 316d for transmission.

As further illustrated in FIG. 3B, control bus 310a is provided to RF front end chip 307a, where control bus 310a is configured to provide phase shift information/signals to phase shifters 324b, 324d, 324f and 324h in RF front end chip 307a to cause a phase shift in at least one of vertically-polarized inputs 336a, 336b, 336c and 336d. Control bus 310a is also configured to provide amplitude control information/signals to PAs 332a, 332b, 332c and 332d in RF front end chip 307a to cause an amplitude change in at least one of vertically-polarized inputs 336a, 336b, 336c and 336d.

In another implementation, when the wireless transceiver is in the reception mode, reconfigurable receive/transmit antennas 316a, 316b, 316c and 316d are configured to be vertical-polarization antennas to provide vertically-polarized signals 318a, 318b, 318c and 318d, respectively, to RF front end chip 307a. In this implementation, when the wireless transceiver is in the transmission mode, reconfigurable receive/transmit antennas 316a, 316b, 316c and 316d are configured to be horizontal-polarization antennas, where RF front end chip 307a is configured to provide horizontally-polarized signals 320a, 320b, 320c and 320d to reconfigurable receive/transmit antennas 316a, 316b, 316c and 316d, respectively, for transmission.

As illustrated in FIG. 3B, in another implementation, when the wireless transceiver is in the reception mode, reconfigurable receive/transmit antennas 316a 316b, 316c and 316d are left-hand circular-polarization receive antennas, that are configured to provide left-hand circularly-polarized signals 318a, 318b, 318c and 318d, respectively, to RF front end chip 307a. In this implementation, when the wireless transceiver is in the transmission mode, reconfigurable receive/transmit antennas 316a 316b, 316c and 316d are right-hand circular-polarization transmit antennas, where RF front end chip 307a is configured to provide right-hand circularly-polarized signals 320a, 320b, 320c and 320d to reconfigurable receive/transmit antennas 316a 316b, 316c and 316d, respectively, for transmission.

In another implementation, when the wireless transceiver is in the reception mode, reconfigurable receive/transmit antennas 316a 316b, 316c and 316d are right-hand circular-polarization receive antennas, that are configured to provide right-hand circularly-polarized signals 318a, 318b, 318c and 318d, respectively, to RF front end chip 307a. In this implementation, when the wireless transceiver is in the transmission mode, reconfigurable receive/transmit antennas 316a 316b, 316c and 316d are left-hand circular-polarization transmit antennas, where RF front end chip 307a is configured to provide left-hand circularly-polarized signals 320a, 320b, 320c and 320d to reconfigurable receive/transmit antennas 316a 316b, 316c and 316d, respectively, for transmission.

Referring now to FIG. 3C, FIG. 3C illustrates a top plan view of a portion of a phased array antenna panel of an exemplary wireless transceiver according to one implementation of the present application. As illustrated in FIG. 3C, phased array antenna panel 302 includes reconfigurable receive/transmit antennas 316a, 316b, 316y and 316z (collectively referred to as reconfigurable receive/transmit antennas 316a through 316z). In the present implementation, substantially every or in fact every antenna in phased array antenna panel 302 is reconfigurable, such that the wireless transceiver is configured to dynamically assign each of the reconfigurable receive/transmit antennas to operate in either the reception mode or the transmission mode.

For example, the wireless transceiver may dynamically assign a portion or all of reconfigurable receive/transmit antennas 316a through 316z to form a receive configuration to operate in the reception mode in one period of time, while assign a portion or all of reconfigurable receive/transmit antennas 316a through 316z to form a transmit configuration to operate in the transmission mode in another period of time. In another implementation, the wireless transceiver may dynamically assign reconfigurable receive/transmit antennas 316a through 316z to form one or more transmit configurations and one or more receive configurations.

In one implementation, reconfigurable receive/transmit antennas 316a through 316z in phased array antenna panel 302 may be configured to communicate with one or more wireless transceivers, such as commercial geostationary communication satellites or low earth orbit satellites having a very large bandwidth in the 10 GHz to 20 GHz frequency range and a very high data rate. As illustrated in FIG. 3C, reconfigurable receive/transmit antennas 316a through 316z may each have a substantially square shape of substantially equal size. In one implementation, each of reconfigurable receive/transmit antennas 316a through 316z in phased array antenna panel 302 needs an area of at least a quarter wavelength (e.g., $\lambda/4 \approx 7.5$ mm) by a quarter wavelength (e.g., $\lambda/4 \approx 7.5$ mm) to receive signals at 10 GHz. These dimensions can also be used to transmit signals at 12 GHz. In one implementation, each of reconfigurable receive/transmit antennas 316a through 316z in phased array antenna panel 302 needs an area of at least a quarter wavelength (e.g., $\lambda/4 \approx 6.25$ mm) by a quarter wavelength (e.g., $\lambda/4 \approx 6.25$ mm) to transmit signals at 12 GHz. These dimensions can also be used to receive signals at 10 GHz. In another implementation, each of reconfigurable receive/transmit antennas 316a through 316z in phased array antenna panel 302 may be configured to transmit or receive signals in the 60 GHz frequency range using much smaller antenna sizes.

In the present implementation, phased array antenna panel 302 is a flat panel array employing reconfigurable receive/transmit antennas 316a through 316z, where phased array antenna panel 202 is coupled to associated active circuits to form beams for reception and transmission. In one implementation, the reception beam is formed fully electronically by means of phase and amplitude control circuits, for example, in RF front end circuits (such as RF front end chips 307a and 307x in FIG. 3A) associated with reconfigurable receive/transmit antennas 316a through 316z. In one implementation, the transmission beam is formed fully electronically by means of phase and amplitude control circuits, for example, in RF front end circuits (such as RF front end chips 307a and 307x in FIG. 3A) associated with reconfigurable receive/transmit antennas 316a through 316z. Thus, phased array antenna panel 302 can provide for beamforming for both reception and transmission without the use of any mechanical parts.

FIG. 4 illustrates an exemplary wireless communications system utilizing exemplary wireless transceivers according to one implementation of the present application. As illustrated in FIG. 4, satellite 460 is configured to communicate (e.g., transmit and receive data and/or signals) with various wireless transceivers, such as wireless transceiver 401a mounted on car 403a, wireless transceiver 401b mounted on recreational vehicle 403b, wireless transceiver 401c mounted on airplane 403c and wireless transceiver 401d mounted on house 403d. It should be understood that car 403a, recreational vehicle 403b and airplane 403c may each be moving, thereby causing a change in position of corresponding wireless transceivers 401a through 401c. It should be understood that, although house 403d can be stationary, the relative position of wireless transceiver 401d to satellite 460 may also change, for example, due to wind or other factors. In the present implementation, wireless transceivers 401a through 401d may each correspond to wireless transceiver 101 in FIG. 1A, where each of wireless transceivers 401a through 401d may include a phased array antenna panel, such as any of phased array antenna panels 202 in FIGS. 2A through 2D, or phased array antenna panel 302 in FIG. 3C, for transmitting and receiving wireless signals to satellite 460 or among themselves.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless transceiver using a phased array antenna panel for concurrently transmitting and receiving wireless signals, said wireless transceiver comprising:
dedicated receive antennas coupled to a receive circuit, said dedicated receive antennas only receiving linearly polarized signals of a first polarization;
dedicated transmit antennas coupled to a transmit circuit, said dedicated transmit antennas concurrently only transmitting linearly polarized signals of a second polarization orthogonal to said first polarization;
said dedicated receive antennas forming a receive beam based on receive phase and receive amplitude information provided by a master chip in said phased array antenna panel;
said dedicated transmit antennas forming a transmit beam based on transmit phase and transmit amplitude information provided by said master chip in said phased array antenna panel;
wherein said receive phase and receive amplitude information for said dedicated receive antennas is provided by an RF front end chip that is connected to said master chip;
wherein four of said dedicated receive antennas surround each of said dedicated transmit antennas.

2. The wireless transceiver of claim 1, wherein said linearly polarized signals of said first polarization are horizontally-polarized signals, and said linearly polarized signals of said second polarization are vertically-polarized signals.

3. The wireless transceiver of claim 1, wherein said linearly polarized signals of said first polarization are vertically-polarized signals, and said linearly polarized signals of said second polarization are horizontally-polarized signals.

4. The wireless transceiver of claim 1, wherein said transmit phase and transmit amplitude information for said transmit antennas is provided by said RF front end chip that is connected to said master chip.

5. The wireless transceiver of claim 1, wherein said transmit phase and transmit amplitude information for said transmit antennas is provided by another RF front end chip that is connected to said master chip.

6. The wireless transceiver of claim 1, wherein each of said transmit antennas is approximately half-way between two of said receive antennas.

7. A wireless transceiver using a phased array antenna panel for concurrently transmitting and receiving wireless signals, said wireless transceiver comprising:
dedicated receive antennas coupled to a receive circuit, said dedicated receive antennas only receiving linearly polarized signals of a first polarization;
dedicated transmit antennas coupled to a transmit circuit, said dedicated transmit antennas concurrently only transmitting linearly polarized signals of a second polarization orthogonal to said first polarization;
said dedicated receive antennas forming a receive beam based on receive phase and receive amplitude information provided by a master chip in said phased array antenna panel;
said dedicated transmit antennas forming a transmit beam based on transmit phase and transmit amplitude information provided by said master chip in said phased array antenna panel;
wherein said receive phase and receive amplitude information for said dedicated receive antennas is provided by an RF front end chip that is connected to said master chip;
wherein said dedicated receive antennas surround a cluster of said dedicated transmit antennas.

8. The wireless transceiver of claim 7, wherein said linearly polarized signals of said first polarization are horizontally-polarized signals, and said linearly polarized signals of said second polarization are vertically-polarized signals.

9. The wireless transceiver of claim 7, wherein said linearly polarized signals of said first polarization are vertically-polarized signals, and said linearly polarized signals of said second polarization are horizontally-polarized signals.

10. The wireless transceiver of claim 7, wherein said transmit phase and transmit amplitude information for said transmit antennas is provided by said RF front end chip that is connected to said master chip.

11. The wireless transceiver of claim 7, wherein said transmit phase and transmit amplitude information for said transmit antennas is provided by another RF front end chip that is connected to said master chip.

12. The wireless transceiver of claim 7, wherein said cluster of said transmit antennas is rectangular.

* * * * *